US006320156B1

(12) United States Patent
Yamaguchi et al.

(10) Patent No.: US 6,320,156 B1
(45) Date of Patent: Nov. 20, 2001

(54) PLASMA PROCESSING DEVICE, PLASMA TORCH AND METHOD FOR REPLACING COMPONENTS OF SAME

(75) Inventors: Yoshihiro Yamaguchi; Kazuhiro Kuraoka, both of Ishikawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/567,064

(22) Filed: May 8, 2000

(30) Foreign Application Priority Data

May 10, 1999 (JP) ... 11-128701
Jun. 1, 1999 (JP) ... 11-153355
Aug. 11, 1999 (JP) ... 11-227306

(51) Int. Cl.[7] ... B23K 10/00
(52) U.S. Cl. ... 219/121.5; 219/121.52; 219/75
(58) Field of Search ... 219/121.5, 121.48, 219/121.51, 121.52, 74, 75, 121.39, 121.49

(56) References Cited

U.S. PATENT DOCUMENTS 3,866,089 * 2/1975 Hengartner ... 219/121.5
5,938,949 * 8/1999 Enyedy et al. ... 219/121.5
6,080,955 * 6/2000 Schwankhart ... 219/121.48
6,163,008 * 12/2000 Roberts et al. ... 219/121.48

FOREIGN PATENT DOCUMENTS 62-50085 3/1987 (JP) .
3-14077 2/1991 (JP) .
3-27309 4/1991 (JP) .

* cited by examiner

*Primary Examiner*—Mark Paschall
(74) *Attorney, Agent, or Firm*—Armstrong, Westerman, Hattori, McLeland & Naughton, LLP

(57) ABSTRACT

The object is to facilitate replacement of consumable parts, such as the electrode, nozzle, or the like, in a plasma torch, whilst suppressing any increase in structural complexity or cost. An electrode 103, insulating guide 105 and nozzle 107 are fit together installed in a retainer cap 113. By means of O-rings 193, 195, 197, the electrode 103, insulating guide 105, nozzle 107 and retainer cap 113 are coupled together by a coupling force which allows the components to be pulled apart and separated manually. By attaching the retainer cap 113 to the torch main unit and detaching the retainer cap 113 from same, the electrode 103, insulating guide 105 and nozzle 107 can be attached and detached to and from the torch main unit, simultaneously.

24 Claims, 12 Drawing Sheets

PLASMA PROCESSING DEVICE, PLASMA TORCH AND METHOD FOR REPLACING COMPONENTS OF SAME

BACKGROUND OF THE INVENTION

1. Field of the Invention

The present invention relates to a plasma processing device for performing plasma arc cutting or plasma arc welding, and more particularly, to improvements to a structure for simplifying the operation of replacing consumable parts, such as electrodes, nozzles, and the like, in a plasma torch.

The present invention also relates to a plasma torch for performing cutting or welding of work by means of a plasma arc formed between an electrode and a work piece, and more particularly, to improvements in the electrical and mechanical connection structure between the electrode and torch main unit.

The present invention also relates to a plasma torch wherein the accuracy of locating the position of the nozzle and electrode is improved.

2. Description of the Related Art

In a plasma torch used for plasma arc processing, there is gradual wear of the electrode and nozzle with the passage of time during which an arc is generated. In some situations, the consumable parts thereof may be replaced several times during the course of a single day's processing work.

In order to replace the electrode and nozzle, it is of course necessary to remove the electrode and nozzle from the plasma torch, but depending on the model, it may also be necessary to remove other peripheral parts at the same time. Such peripheral parts may include, for example, insulating guides inserted between the electrode and nozzle, and one type or several types of caps, or the like, provided covering the outer side of the nozzle.

The plasma torch is fixed to a carriage provided on the upper portion of a working table, and it performs cutting or welding operations with respect to a work piece on the working table, whilst being conveyed by the carriage and moved along a programmed path of travel. When exchanging the consumable parts in the torch, usually, the torch is withdrawn to a position where the exchanging operation can be readily performed, whereupon the torch is disassembled and the consumable parts are replaced. However, since the replacing operation is carried out on the work table, this task is not necessarily easy to perform. Moreover, since it is necessary to remove and then reattach a plurality of small components during the replacing operation, care must be taken that these small components are not dropped. Furthermore, it is necessary to perform the task of reattaching components with a very great deal of caution, in order that no dust, or the like, generated by cutting, enters into the inner portion of the torch.

In order that the painstaking task of exchanging consumable parts can be carried out in a straightforward manner, plasma torches known variously as "cassette torches", "one-touch torches" or "quick-change torches" have been disclosed (Japanese Patent Application Laid-open No. 62-500085, Japanese Patent Publication No. 03-27309.) A cassette-type torch is divided into two sections : a head section comprising a torch end portion, electrode, nozzle, gas tubes, cooling water tubes, and the like, and a base section comprising a power supply cable, gas tubes, cooling water tubes, and the like, which are connected to the head section. The head section and base section are devised in such a fashion that they can be connected and separated in a straightforward manner. A plurality of head sections in which new consumable parts are installed are prepared in advance, and the consumable parts can be replaced simply, by exchanging only the head section connected to the base section. In this cassette-type torch, the replacement of consumable parts can also be automated.

In a cassette-type plasma torch, two electric current paths (for the electrode and nozzle) operating at high current and high voltage, and at least one gas passage (for the plasma gas), and feed and return water passages in a cooling water circuit, are divided into a portion on the head section side and a portion on the base section side, the connection, electrical insulation and seals between these portions being established at the dividing surfaces between the head section and the base section.

Therefore, compared to a standard conventional torch described previously, which does not have a cassette system, the cassette-type torch provides simpler replacement of consumable parts, but since the structure of the torch is more complex, it is significantly more expensive. In other words, since it is necessary to ensure satisfactory electrical insulation and sealing at the connecting surfaces of the head section and base section, in order that there are no electrical insulation faults or gas or water leaks, in addition to the operation of simply connecting and separating the head section and base section, a special structure which is not required in a standard torch must be employed, and therefore, the cost thereof increases. For example, whereas the cost of a standard torch may be 100,000 yen, the cost of a cassette-type torch having the same processing capacity may be 400,000 yen, or the like. Consequently, in practice, cassette-type torches have not become widely used.

In general, since electrodes are consumable parts and need to be replaced frequently, a sleeve-shaped electrode seating is installed inside the main unit of the torch, and the electrode is mounted detachably on the sleeve-shaped electrode seating. The electrode seating serves not only to fix the electrode mechanically, but also acts as an electrical terminal for supplying an arc current to the electrode.

In a conventional plasma torch, the electrode and seating each respectively comprise electrical connection surfaces which are perpendicular to the axis of the torch. The electrode is only able to move linearly in the direction of the torch axis, with respect to the seating. Therefore, if the electrode is installed in the seating whilst foreign matter, such as dirt or dust, is attached to the electrical connection surfaces, then the electrical connection surfaces will rise up due to this foreign matter and hence fail to fit together completely, leading to connection faults. In this case, the electrical connection surfaces will generate heat and may experience melting. There is an especially high probability of connection faults occurring in low-current types of torch which have a weak attachment force. Therefore, when installing an electrode, it is necessary to perform the painstaking task of cleaning the entire electrical connection surfaces, very carefully, by wiping the electrical connection surface of the electrode and the electrical connection surface inside the main unit of the torch, adequately, with gauze, or the like.

By the way, conventionally, various techniques have been proposed for maintaining a high degree of positioning accuracy of the nozzle and the electrode. One of these conventional techniques proposes that the nozzle and electrode are located in position in the axial direction and radial direction, by forming the inner surface of the nozzle and the outer surface of the electrode as interlocking surfaces, forming step sections in these respective interlocking surfaces, and interposing an insulating material therebetween, whilst the electrode is coupled integrally to the torch main unit by fixing the nozzle to the end portion of the torch main unit (for example, Japanese Utility Model Application Laid-Open No. 03-14077.)

According to the conventional technology described above, the smaller the clearances allowed respectively between the nozzle, electrode and insulating material, the higher the level of positioning accuracy that can be maintained. However, if the clearance gaps between the nozzle, electrode and insulating material are made too small, they will become difficult to fit together and take apart, when exchanging the nozzle or electrode, and hence the replacing operation is impeded.

For this reason, in the prior art, the clearances between these parts have been set to relatively large values, thus leading to problems in that the positioning accuracy of the nozzle and electrode declines as a consequence.

On the other hand, it has also been proposed that the nozzle, electrode and insulating material are fabricated as an integrated part, thereby dramatically improving the positioning accuracy of the nozzle and the electrode.

However, if an integrated part is used in this way, the whole part must be replaced, even if only one of the nozzle or the electrode has come to the end of its life, whilst the other is still in a usable state. Moreover, since the insulating material, which is not a consumable item, is also replaced at the same time, there is an increase in running costs.

Therefore, it is an object of the present invention to enable consumable parts to be replaced in a simple fashion, whilst avoiding increased complexity in the structure of a plasma torch and increased costs for same.

It is a further object of the present invention to simplify the task of installing an electrode, whilst avoiding connection faults between electrical connection surfaces due to foreign matter.

It is yet a further object of the present invention to resolve the problems of the prior art described above, by adopting a composition wherein a nozzle and an electrode can be replaced independently, whilst the positioning accuracy of the nozzle and electrode is improved.

SUMMARY OF THE INVENTION

The plasma torch according to the first aspect of the present invention comprises a torch main unit having cooling water piping and plasma gas piping, and a detachable section installed detachably on this torch main unit.

The detachable section comprises: an electrode; a nozzle disposed in such a manner that it surrounds the electrode; an insulator interposed between the electrode and the nozzle; and a retainer cap which accommodates the electrode, nozzle and insulator internally. The torch main unit comprises an electrode connecting section for coupling to the electrode, a nozzle connecting section for coupling to the nozzle, and a retainer cap connecting section for connecting to the retainer cap.

The coupling structure between the electrode and the electrode connecting section and the coupling structure between the nozzle and the nozzle connecting section are devised as follows. Specifically, when a coupling operation is performed whereby the retainer cap is brought along a predetermined path (for example, along the torch axis) close to the retainer cap connecting section and coupled thereto, the electrode and nozzle respectively couple to the electrode connecting section and the nozzle connecting section in the torch main unit, and furthermore, when a detaching operation is performed whereby the retainer cap is moved along the predetermined path away from the retainer cap connecting section and separated therefrom, the electrode and nozzle respectively are detached from the electrode connecting section and nozzle connecting section in the torch main unit. Moreover, the electrode, insulator, nozzle and retainer cap are mutually coupled, and the mutual coupling force between these parts is stronger than either the coupling force between the electrode and the electrode connecting section or the coupling force between the nozzle and the nozzle connecting section. Therefore, by attaching and detaching the retainer cap to and from the retainer cap connecting section, it is possible to attach and detach all the parts in the detachable section, to and from the torch main unit, simultaneously.

In the plasma torch according to the present invention having the composition described above, the whole detachable section is unified, in other words, the electrode, insulator and nozzle can be installed on the torch main unit and detached from the torch main unit, simultaneously with the retainer cap. Therefore, when replacing consumable parts, such as an electrode, nozzle, or the like, it is not necessary to perform the operation of detaching the electrode or nozzle, individually, from the torch main unit and reattaching the electrode or nozzle to same, but rather the electrode and nozzle can be detached from and reattached to the torch main unit, simply by means of the operation of detaching the retainer cap from the torch main unit and reattaching the retainer cap to same. Therefore, the task of replacing consumable parts is straightforward. It is also possible to adopt a composition whereby consumable parts are replaced in a fully automatic or semi-automatic fashion, by using an automatic replacing device.

Furthermore, the plasma torch according to the second aspect of the present invention has a composition whereby an electrode nozzle and retainer cap are coupled to a torch main unit. This is definitively different to the structure of a conventional cassette-type torch. Specifically, a conventional cassette-type torch has, in addition to an electrode, nozzle and cap, an intermediate connecting structure for establishing electrical connection and piping connection between a head section and a torch main unit. However, the plasma torch according to the present invention does not require an intermediate connecting structure.

In a preferred embodiment of the invention, the electrode and nozzle can be detached individually from a retainer cap. Therefore, it is possible to replace the electrode only or to replace the nozzle only.

In a preferred embodiment of the invention, the electrode, nozzle and retainer cap are coupled mutually by means of a coupling structure which employs an elastic member. Therefore, since the electrode and nozzle can be detached readily from the retainer cap by releasing the coupling by causing the elastic member to deform, the task of exchanging consumable parts is further simplified.

In a preferred embodiment of the invention, the electrode and electrode connecting section respectively have mutually contacting electrical connection surfaces for ensuring electrical connection between these two members, and the respective electrical connection surfaces of the electrode and the electrode connecting section are caused to make mutual contact by applying a pressing force due to deformation of an elastic deforming section provided on at least one of the electrode and/or electrode connecting section. Therefore, even if the coupling structure between the electrode and electrode connection section can be readily coupled and decoupled, simply by inserting the electrode into the electrode connecting section, causing it to interlock with same, for example, it is possible to ensure good electrical connection of the electrical connection surfaces by means of the pressing force caused by deformation of the elastic deforming section.

The plasma torch according to the third aspect of the present invention is provided with an electrode for generating an arc, and an electrode seating, which is coupled detachably with the electrode to hold the electrode, and is electrically connected to the electrode to supply an arc current to the electrode. The electrode and electrode seating respectively have electrical connection surfaces, and the electrode and electrode seating are electrically connected by means of mutual contact between the respective electrical connection surfaces. Furthermore, at least one of the electrode and the electrode seating comprises an elastic member which deforms elastically when the electrode and electrode seating are coupled together, in such a manner that one electrical connection surface is pressed against the other electrical connection surface by means of the elastic force generated by deformation of this elastic member.

According to this plasma torch, when the electrode and electrode seating are coupled together, the elastic member undergoes elastic deformation and this elastic force causes the electrical connection surface of either the electrode or the electrode seating to be pressed against the other electrical connection surface. Even in cases where a degree of foreign matter becomes attached to the electrical connection surfaces, during the process of installing the electrode in the seating, the foreign matter is crushed by friction between the two electrical connection surfaces when they are pressed together under this elastic force, and hence a good connection is established between the electrical connection surfaces.

In a preferred embodiment of the invention, the electrical connection surfaces of the electrode and the electrode seating are completely (or partially) cylindrical or conical surfaces having a common central axis with the central axis of the electrode. When an electrode is coupled to an electrode seating, the respective electrical connection surfaces of the electrode and electrode seating rub against each other, due to movement of the electrode in the direction of its central axis, or slight rotation thereof about the central axis, with respect to the electrode seating. Therefore, foreign matter is readily crushed and a tight connection is readily established between the electrical connection surfaces.

Moreover, the installation task is also simple to perform.

In a preferred embodiment of the invention, when the electrode is coupled to the electrode seating, a cooling water passage is formed inside the electrode and the electrode seating. The mutually contacting electrical connection surfaces of the electrode and electrode seating are located in the vicinity or this cooling water passage, or inside this cooling water passage. Therefore, since the electrical connection surfaces are cooled significantly by the cooling water, then even in cases where the electrical resistance between the electrical connection surfaces is relatively high and heat is generated thereby, there will be no occurrence of melting.

The electrode for a plasma torch according to the fourth aspect of the present invention comprises an electrical connection surface which contacts an electrical connection surface of an electrode seating, thereby forming an electrical connection with same, when the electrode is coupled to the electrode seating of the torch, and an elastic member which undergoes elastic deformation and presses the electrical connection surface of the electrode against the electrical connection surface of the electrode seating by means of elastic force, when the electrode is coupled to the electrode seating.

In a preferred embodiment of the invention, the electrode has an approximately cylindrical shape, the front end portion thereof having a heat-resistant insert forming the arc generating point, and the base end portion thereof having a skirt section which is inserted into the electrode seating, this skirt section being divided by a plurality of slits into a plurality of tongue-shaped elastic members respectively capable of elastic deformation in an inward direction. Furthermore, an electrical connection surface is formed on the outer circumference of these tongue-shaped elastic members. By inserting the electrode into the electrode seating, the tongue-shaped elastic members are caused to deform in an inward direction, and the electrical connection surfaces on the outer circumference thereof are pressed against the electrical connection surface of the electrode seating. Any foreign matter present is crushed by rubbing between the electrical connection surface of the electrode and the electrical connection surface of the seating, caused by movement of the electrode in the axial direction with respect to the seating, when the electrode is inserted, or slight rotation of the electrode about its central axis, after it has been inserted, and hence tight contact is established between the electrical connection surfaces.

The plasma torch according to the fifth aspect of the present invention is a plasma torch having a nozzle disposed at the front end portion of a torch main unit in such a manner that it covers an electrode and separates same from a plasma gas passage, wherein a plasma arc is generated between the electrode and a object to be cut, by means of an orifice in the nozzle, comprising: a cylindrical guide made from insulating material which is inserted between the electrode and the nozzle; a first elastic member, interposed between the outer surface of the electrode and the inner surface of the guide, in a continuous fashion about the circumference thereof, or in a plurality of locations about the circumference thereof, for positioning the electrode and the guide in the radial direction by means of elastic expansion and contraction; and a second elastic member interposed between the outer surface of the guide and the inner surface of the nozzle, in a continuous fashion about the circumference thereof, or in a plurality of locations about the circumference thereof, for positioning the guide and the nozzle in the radial direction by means of elastic expansion and contraction.

In this plasma torch, a first elastic member is interposed between the outer surface of the electrode and the inner surface of the guide, and a second elastic member is interposed between the outer surface of the guide and the inner surface of the nozzle. Typically, both the first and second elastic members are provided in a continuous circumferential fashion, for example, in the form of an O-ring, but they are not necessarily limited to this form, and may also be provided in a plurality of separate locations about the circumference. The first elastic member automatically regulates the positions of the electrode and guide in the radial direction (in other words, it aligns the central axes thereof,) by means of elastic expansion and contraction. The second elastic member regulates the positions of the guide and nozzle in the radial direction (in other words, it aligns the central axes thereof,) by means of elastic expansion and contraction. Consequently, the positions of the electrode and nozzle in the radial direction are automatically regulated (in other words, the central axes thereof are aligned).

In a preferred embodiment of the invention, either the electrode or the nozzle, for example, the electrode, is fixed to the torch main unit. Moreover, the other, namely, the nozzle, for example, assumes a state where it is free from external forces apart from the force applied from the electrode via the first elastic member, the guide and the second elastic member. In other words, when the electrode is fixed to the torch main unit, the nozzle is not subjected to any force in the radial direction other than the position regulating forces imparted by the first and second elastic members. Consequently, the action of regulating the radial position imparted by the first and second elastic members works effectively, without interference from outside forces, and hence the central axes of the electrode and nozzle are aligned accurately.

In a preferred embodiment of the invention, the nozzle comprises a first step section, on the inner side thereof, which confronts one end of the guide and determines the positional relationship between the guide and the nozzle in the axial direction thereof. Moreover, the electrode comprises a second step section, on the outer side thereof, which confronts the other end of the guide and determines the positional relationship between the guide and the electrode in the axial direction thereof. Therefore, the distance between the first step section in the nozzle and the second step section in the electrode is determined absolutely by the axial dimension of the guide, and therefore positioning of the nozzle and electrode in the axial direction thereof can be performed accurately.

In a preferred embodiment of the invention, the nozzle is fixed to the torch main unit by being retained by a retainer cap. The retainer cap fixes the nozzle to the torch main unit simply by means of the pressing force exerted towards the torch main unit in a substantially parallel direction to the central axis of the nozzle, when the nozzle is fixed to the torch main unit. Therefore, when the nozzle is fixed to the torch main unit by means of the retainer cap, since force is applied to the nozzle not only in the axial direction but also in the radial direction and rotational direction, it is possible to regulate the position thereof in the radial direction, effectively, by means of the aforementioned first and second elastic members, thereby enabling the central axes of the electrode and nozzle to be aligned in an accurate manner.

According to the sixth aspect of the present invention, a cylindrical guide made from insulating material and fitted between the nozzle and electrode of a plasma torch comprises an inner surface confronting the outer surface of the electrode and an outer surface confronting the inner surface of the nozzle. A first elastic member receiving section for receiving the aforementioned first elastic member is provided on the inner circumference of the guide.

Moreover, a second elastic member receiving section for receiving the aforementioned second elastic member is provided on the outer circumference of the guide. By inserting this guide into the electrode by means of the first elastic member, and then fitting the nozzle into this guide by means of the second elastic member, the positions of the electrode and nozzle in the radial direction are automatically adjusted by the action of the first and second elastic members.

According to the seventh aspect of the present invention, a cylindrical guide made from insulating material fitted between a nozzle and an electrode of a plasma torch is provided with an inner surface confronting the outer surface of the electrode. Furthermore, a clearance exists between the inner circumference of the guide and the outer circumference of the electrode, in order that the positions of the electrode and the guide in the radial direction can be regulated by means of elastic expansion and contraction of an O-ring inserted therebetween. This guide can be attached and detached to and from the electrode, readily, by means of the aforementioned clearance between the inner surface of the guide and the outer surface of the electrode, and the O-ring inserted therebetween, and furthermore, the central axes of the guide and electrode can be aligned automatically.

According to the eighth aspect of the present invention, a cylindrical guide made from insulating material fitted between a nozzle and an electrode of a plasma torch is provided with an outer surface confronting the inner surface of the nozzle. Furthermore, a clearance exists between the outer circumference of the guide and the inner circumference of the nozzle, in order that the positions of the guide and the nozzle in the radial direction can be regulated by means of elastic expansion and contraction of an O-ring inserted therebetween. This guide can be attached and detached to and from the nozzle, readily, by means of the aforementioned clearance between the outer surface of the guide and the inner surface of the nozzle, and the O-ring inserted therebetween, and furthermore, the central axes of the guide and nozzle can be aligned automatically.

According to the ninth aspect of the present invention, a nozzle, disposed on the inner side of a plasma torch in such a manner that it covers an electrode by means of a cylindrical guide made from insulating material, comprises an inner surface which confronts the outer surface of the guide. An elastic member contacting section for contacting an elastic member is provided on the inner circumference of the nozzle. The elastic member is interposed between the outer circumference of the guide and the inner circumference of the nozzle, and automatically regulates the positions of the guide and nozzle in the radial direction, by means of elastic expansion and contraction.

According to the tenth aspect of the present invention, a nozzle, disposed on the inner side of a plasma torch in such a manner that it covers an electrode by means of a cylindrical guide made from insulating material, comprises an inner surface which confronts the outer surface of the guide. Furthermore, a clearance exists between the outer circumference of the guide and the inner circumference of the nozzle, in order that the positions of the guide and the nozzle in the radial direction can be regulated by means of elastic expansion and contraction of an O-ring inserted therebetween. The guide can be attached to and detached from the nozzle, readily, by means of the aforementioned clearance and the O-ring inserted therebetween, and furthermore, the central axes of the guide and nozzle can be aligned automatically thereby.

According to the eleventh aspect of the present invention, an electrode, disposed on the inner side of a plasma torch in such a manner that it is covered by a nozzle by means of a cylindrical guide made from insulating material, comprises an outer circumference which confronts the inner circumference of the guide. An elastic member contacting section for contacting an elastic member is provided on the outer circumference of the electrode. The elastic member is interposed between the inner circumference of the guide and the outer circumference of the electrode, and automatically regulates the positions of the guide and electrode in the radial direction, by means of elastic expansion and contraction.

According to the twelfth aspect of the present invention, an electrode, disposed on the inner side of a plasma torch in such a manner that it is covered by a nozzle by means of a cylindrical guide made from insulating material, comprises an outer circumference which confronts the inner circumference of the guide. A clearance exists between the inner circumference of the guide and the outer circumference of the electrode, in order that the positions of the guide and the electrode in the radial direction can be regulated by means of elastic expansion and contraction of an O-ring inserted therebetween.

The electrode can be attached and detached to and from the guide, readily, by means of the aforementioned clearance and the O-ring inserted therebetween, and furthermore, the central axes of the electrode and the guide can be aligned automatically thereby.

Further characteristics of the present invention will become apparent in the following description of the embodiments.

PREFERRED EMBODIMENTS OF THE INVENTION

Figure 1:
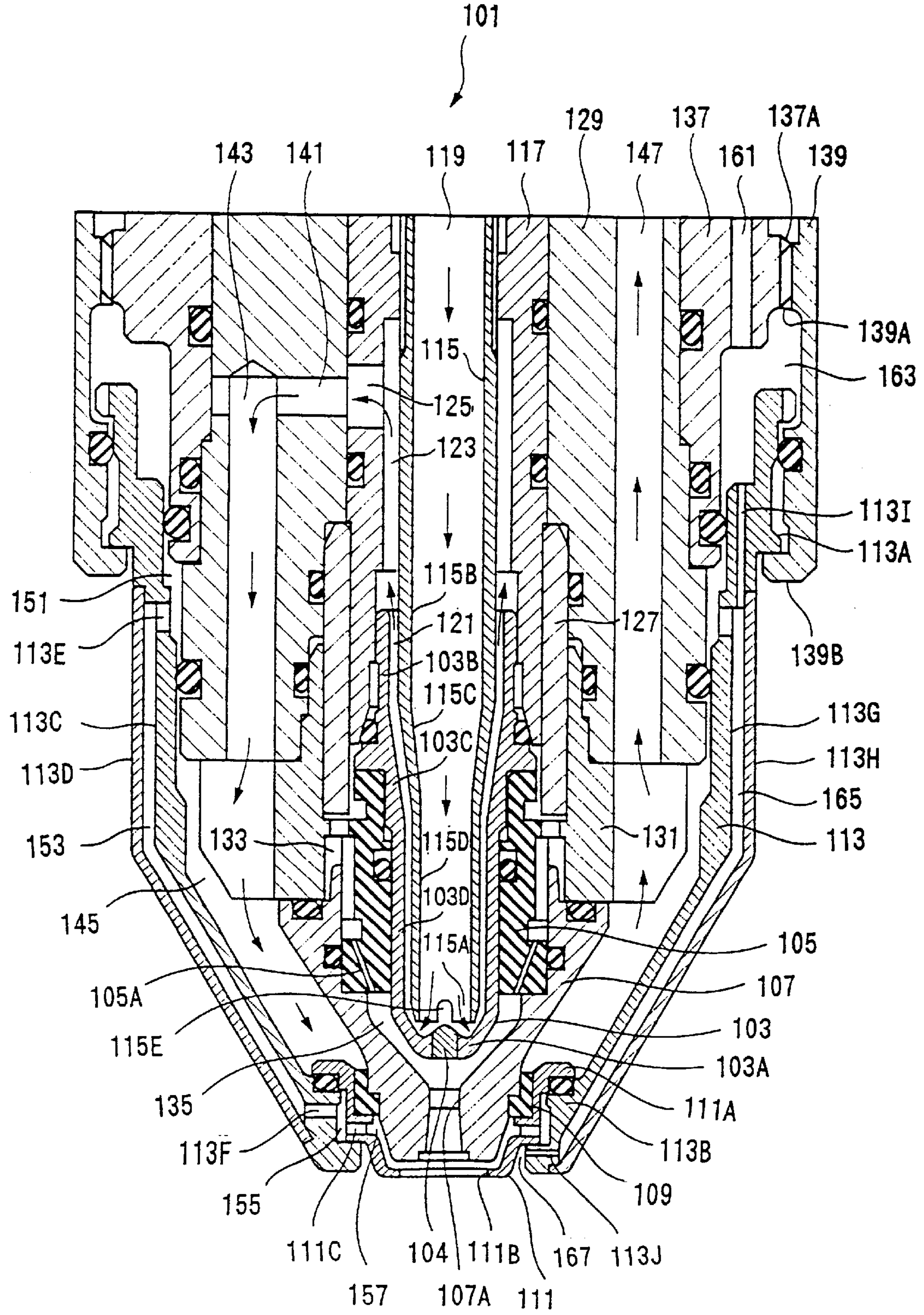
FIG. 1 is a sectional view along the central axis of a plasma torch for cutting according to a first embodiment of the present invention.

FIG. 1 is a sectional view along the central axis of a plasma torch for cutting according to a first embodiment of the present invention.

Figure 2:
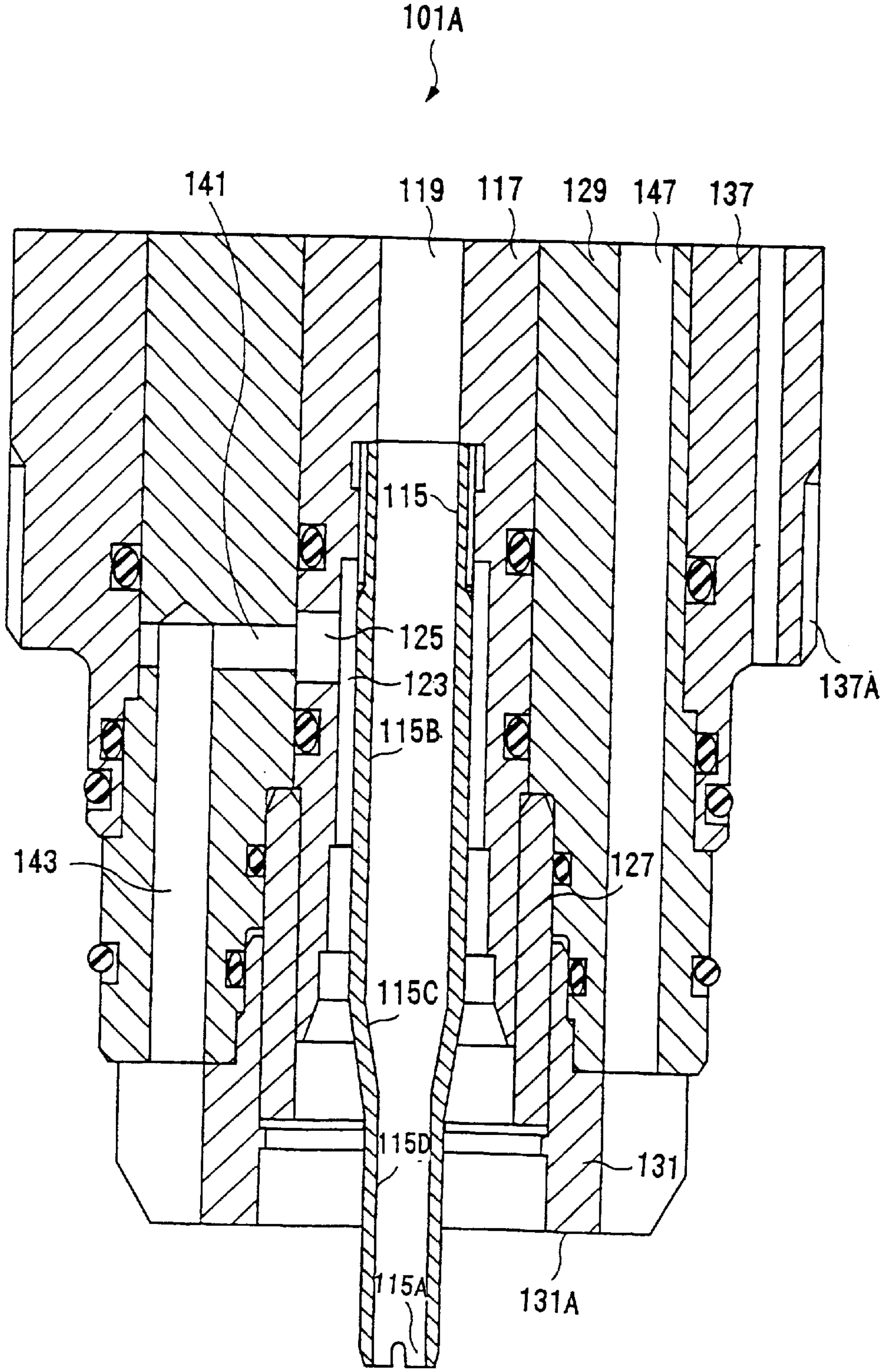
FIG. 2 is a sectional view of a torch main unit when a retainer cap 113 has been removed from the aforementioned plasma torch.
Figure 3:
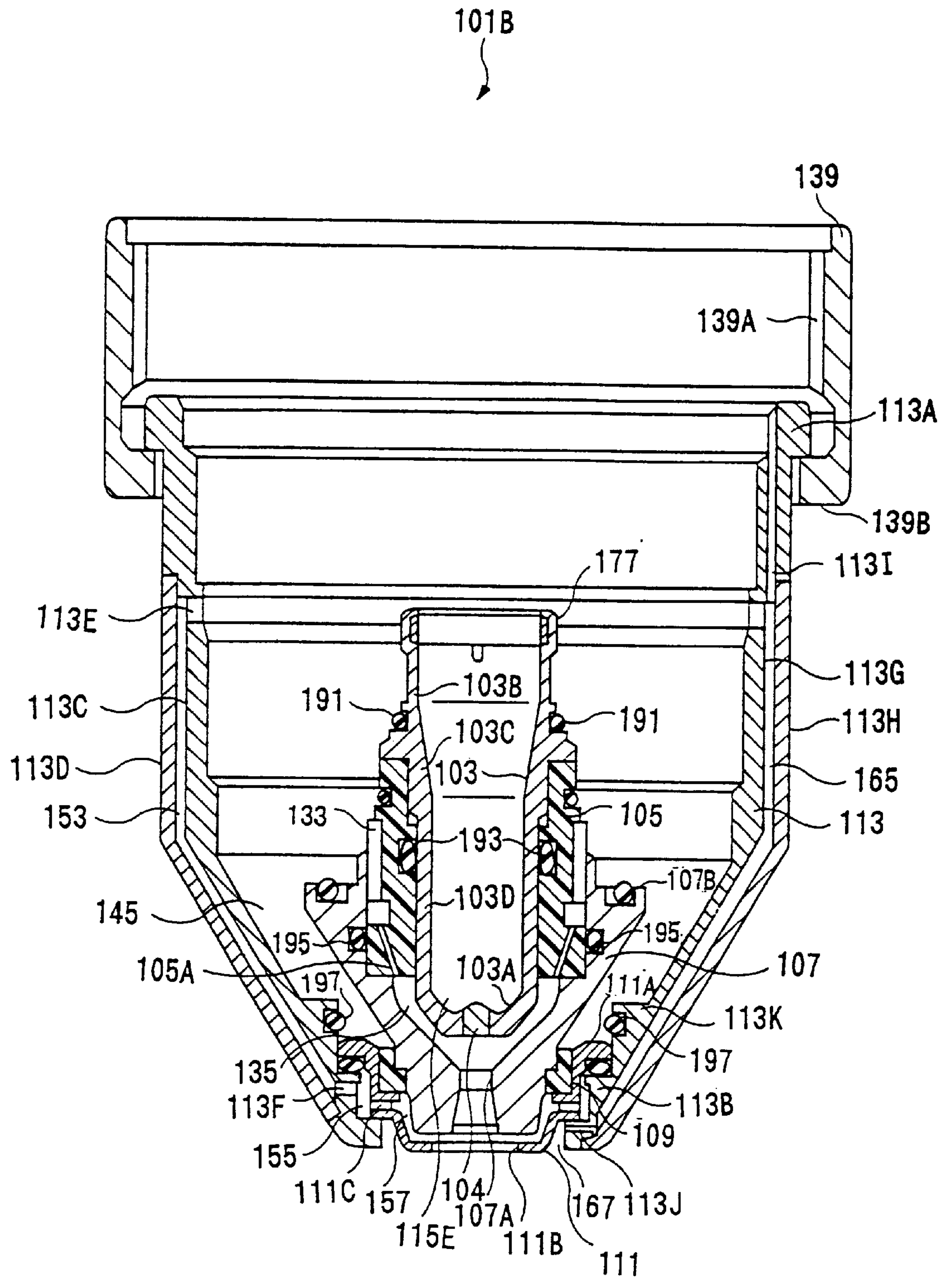
FIG. 3 is a sectional view of a set comprising a retainer cap 113 and consumable parts that are detached together with same, when a retainer cap 113 is detached from the aforementioned plasma torch.

The plasma torch 101 is devised such that a cap (retainer cap) 113 constituting the outer shell of the front end portion of the torch is detached when consumable parts, such as the electrode 103, nozzle 107, and the like, are replaced. When the retainer cap 113 is detached, all of the consumable parts are detached simultaneously from the torch main unit, in a state where they are coupled to the retainer cap 113. FIG. 2 shows a sectional view of the torch main unit when the retainer cap 113 has been detached, and FIG. 3 shows a sectional view of a set comprising the retainer cap 113 and all of the parts which are detached simultaneously with the retainer cap 113.

Firstly, the overall composition of the cutting plasma torch 101 is described with reference principally to FIG. 1, also with additional reference to FIG. 2 and FIG. 3.

The plasma torch 101 is divided broadly into a torch main unit 101A (portion shown in FIG. 2) which is fixed to a carriage (not illustrated), and a detachable section 101B (portion shown in FIG. 3) which is installed detachably on the torch main unit 101A. The detachable section 101B comprises, in order from the central axis of the torch towards the outer side thereof, the electrode 103, an insulating guide 105, the nozzle 107, an insulating ring 109, a shield cap 111, the retainer cap 113 and a rotating ring 139, of which the electrode 103 and the nozzle 107, in particular, are consumable parts that need regular replacement. By detaching the retainer cap 113 from the torch main unit 101A, the whole detachable section 101B is removed from the torch main unit 101A, simultaneously in one operation. The action of separating the electrode 103, insulating guide 105 or nozzle 107 from the detachable section 101B is carried out readily, simply by manually pulling these parts away from the retainer cap 113. The action of installing the detachable section 101B on the torch main unit 101A is carried out readily, by the simple operation of installing the retainer cap 113 on the torch main unit 101A, and it is not necessary to perform the task of installing the various parts of the detachable section 101B onto the torch main unit 101A, individually.

A water pipe 115 of circular cross-section for introducing cooling water to the inner portion of the electrode 103 is provided in the central axis of the torch 101 (torch main unit 101A). A cylindrical inner sleeve 117 is fitted about the outer circumference of the base end portion of the water pipe 115, in a coaxial position with respect to same. The base end portion of a cylindrical electrode 103 fits in the inner side of the front end portion of an inner sleeve 117. The electrode 103 has a closed front end section 103A, and a heat-resistant insert 104 made from hafnium, or the like, is installed in the central portion of the front end section 103A, which forms the arc generating point. The rear face of the heat-resistant insert 104 is exposed to the space on the inside of the electrode 103 where cooling water flows.

The water pipe 115 projects in a forward direction from the front end face of the inner sleeve 117 and leads deep inside the electrode 103, such that the water outlet 115A of the water pipe 115 reaches a position immediately behind the heat-resistant insert 104 at the front end section 103A of the electrode 103. With regard to its diameter, the water pipe 115 is constituted by a wide, large-diameter section 115B where it enters into the inner sleeve 117, a narrow, small-diameter section 115D extending for a predetermined length from the water outlet 115A at the front end of the pipe where it enters into the electrode 103, and a tapered section 115C which has a taper linking the large-diameter section 115B with the small-diameter section 115D. The width of the electrode 103 also varies similarly in accordance with the changing width of the water pipe 115. Specifically, the electrode 103 is wide in the base end region 103B where the large-diameter section 115B of the water pipe is accommodated, and the internal diameter thereof tapers in portion 103C where the tapered section 115C of the water pipe is accommodated, and the electrode 103 is narrow in the front end portion 103D thereof, where the small-diameter section 115D of the water pipe is accommodated.

Furthermore, the outer side of the narrow front end portion 103D of the electrode 103 is covered by a nozzle 107. Therefore, the narrow front end portion 103D of the electrode 103 serves to reduce the overall width of the torch 101. For this reason, desirably, that the external diameter of the small-diameter section 115D of the water pipe 115 is made as small as possible, whilst the internal diameter of the water pipe 115 (in other words, the sectional surface area of the cooling water passage 119) is devised in such a manner that there is no large difference between the small-diameter section 115D and the large-diameter section 115B. In order to satisfy this requirement, the wall of the water pipe 115 is made thinner in the small-diameter section 115D than in the large-diameter section 115B.

The water pipe 115 has a primary cooling water passage 119 provided therein. A cooling water passage 121 is also formed between the inner circumference of the electrode 103 and the outer circumference of the water pipe 115. A cooling water passage 123 is formed between the inner circumference of the inner sleeve 117 and the outer circumference of the water pipe 115. A cooling water passage 125 is formed which penetrates the wall of the inner sleeve 117. The cooling water passages 119, 121, 123 and 125 are connected respectively in this sequence. The cooling water passages 119 and 121 inside the electrode 103 are designed in such a manner that they have practically the same sectional surface area, thereby minimizing the resistance (pressure loss) in the supply and return cooling water passages 119 and 121 which divide up the limited space inside the electrode. In order to minimize the pressure loss in the cooling water pipes 123 and 125, these pipes 123 and 125 are designed in such a manner that they have the maximum possible sectional surface area within the range of structural feasibility.

A ring magnet 127 for causing the arc generating point on the heat-resistant insert 104 of the electrode 103 to rotate is fitted onto the outer circumference of the front end portion of the inner sleeve 117. A cylindrical outer sleeve 129 fits onto the outer circumference of the base end portion of the inner sleeve 117. A short cylindrical nozzle seating 131 is fixed to the front end portion of the outer sleeve 129, and an approximately conical nozzle 107 which tapers towards the front end thereof, is attached to the front end portion of this nozzle seating 131. The nozzle 107 is positioned coaxially with respect to the electrode 103, surrounding the outer side of the aforementioned narrow portion 103D of the electrode 103. A nozzle orifice 107A is formed in the central axis position of the front end portion of the nozzle 107, facing the front face of the heat-resistant insert 104, in order that the plasma arc is narrowly confined and caused to be emitted in a forward direction.

A cylindrical insulating guide 105 is fitted between the nozzle 107 and the electrode 103, in order to provide electrical insulation therebetween. A plurality of grooves 133 are formed on the outer circumference of the insulating guide 105, in a parallel direction to the axis thereof, and these plural grooves 133 serve as plasma gas passages. Plasma gas is introduced into these plasma gas passages 133 from a plasma gas supply path, which is not illustrated. (The plasma gas supply path passes through the interior of the outer sleeve 129 and the nozzle seating 131.) A plasma gas passage 135 connecting to the nozzle orifice 107A is formed between the nozzle 107 and the front end section 103A of the electrode 103. Moreover, the insulating guide 105 also comprises a plurality of plasma gas swirler holes 105A, provided at regular intervals about the circumference thereof and inclined at a slight angle in the circumferential direction with respect to the radial direction, in such a manner that the plasma gas passages 133 and plasma gas passage 135 are mutually connected. Plasma gas enters from the plasma gas passages 133 into the plasma gas swirler holes 105A, and it forms a swirling current from the plasma gas swirler holes 105A and is injected into the plasma gas passage 135. This swirling current of plasma gas flows along the plasma gas passage 135 and is turned into plasma by the energy of the arc at the front face of the heat-resistant insert 104, thereby forming a swirling current of plasma which is emitted from the nozzle orifice 107A.

The front end portion of the nozzle 107 is covered by a short cylindrical shield cap 111 in order to protect the nozzle 107 from the work, molten metal spraying up from the work, or the like. An insulating ring 109 is fitted between the nozzle 107 and the shield cap 111, in order to provide electrical insulation therebetween. The outer side of this structure is covered by a cylindrical retainer cap 113 which tapers towards the front end thereof.

A cylindrical rotating ring 139 is fitted to the outer side of the base end portion of the retainer cap 113. A ring-shaped hook 139B, formed such that it bends inwards at the front end portion of the rotating ring 139, engages with a flange 113A formed on the base end portion of the retainer cap 113, by means of which the rotating ring 139 pulls up the retainer cap 113. Moreover, a cylindrical fixed ring 137 is fitted to the outer circumference of the base end portion of the outer sleeve 129. A female screw thread 139A formed on the inner circumference of the rotating ring 139 engages with a male screw thread 137A formed on the outer circumference of the fixed ring 137. The screw coupling between the rotating ring 139 and the fixed ring 137 can be tightened or loosened by causing the rotating ring 139 to rotate about the central axis of the torch. When the rotating ring 139 is tightened on the fixed ring 137 to its fullest extent, then the retainer cap 113 is pulled onto and fixed to the torch main unit 101B by means of the rotating ring 139.

A ring-shaped hook 113B disposed at the front end portion of the retainer cap 113 engages with a flange 111A disposed at the base end portion of the shield cap 111, by means of which the retainer cap 113 pulls and fixes the set of components comprising the shield cap 111, insulating ring 109, nozzle 107, insulating guide 105 and electrode 103, onto the torch main unit. In addition to the function of retaining the various internal components in this way, the retainer cap 113 also has the function as acting as an outer shell for the torch 101 at the front end region thereof.

The outer sleeve 129 comprises a cooling water passage 141 running in a radial direction, a cooling water passage 143 running in a parallel direction to the central axis of the torch, and a further cooling water passage 147 running in a parallel direction to the central axis of the torch, at a separate location from the cooling water passage 143. Moreover, a cooling water passage 145 surrounding the outer side of the nozzle 107 is formed between the outer circumference of the nozzle 107, the inner circumference of the retainer cap 113 and the base end face of the shield cap 111. The cooling water passage 125 inside the inner sleeve 117, the cooling water passages 141 and 143 inside the outer sleeve 129, the cooling water passage 145 surrounding the nozzle 107 and the one further cooling water passage 147 inside the outer sleeve 129 are mutually connected in this sequence. The cooling water passage 147 is also connected to a cooling water discharge passage, which is not illustrated. In order that pressure loss in the cooling water passages minimized, the cooling water passages 141, 143, 147 inside the outer sleeve are designed in such a manner that they have the maximum possible sectional surface area within the range of structural feasibility.

As indicated by the arrows, firstly the cooling water exits from the water outlet 115A via the cooling water passage 119 in the water pipe 115, whereupon it confronts the rear face of the heat-resistant insert 104, which is the hottest part of the front end section 103A of the electrode 103, thereby cooling the heat-resistant insert 104. The heat-resistant insert 104 is cooled effectively by the direct flow of cooling water. Moreover, whilst the front face of the heat-resistant insert 104 is flat, the rear face thereof is formed with a curve wherein the central portion thereof is high and the perimeter thereof is low, as indicated in the drawings, thereby ensuring that the rear face, in other words, the surface in contact with the cooling water, has a large surface area. Furthermore, this curved shape also serves to direct the cooling water exiting from the water outlet 115A, smoothly, in a reverse direction, towards the cooling water passage 121. One or two slits 115E are provided in the perimeter of the water outlet 115A of the water pipe 115. A certain ratio of the cooling water flowing along the cooling water passage 119 escapes through the slit 115E, without coming into contact with the heat-resistant insert 104, and passes into the cooling water passage 121, thereby contributing efficiently to cooling of the nozzle 107. The cooling water channelled along cooling water passage 121 cools the electrode 103 whilst passing through cooling water passage 121 which runs along the inner circumference of the electrode 103, whereupon it passes in sequence along cooling water passages 123, 125, 141 and 153, and enters into the cooling water passage 145 surrounding the nozzle 107. The cooling water entering and passing through the cooling water passage 145 cools the nozzle 107, the shield cap 111 and the retainer cap 113, simultaneously. The fact that all of the parts in the region of the nozzle which require cooling, namely, the nozzle 107, shield cap 111 and retainer cap 113, are exposed to the inside of the same single cooling water passage 145 and are cooled simultaneously by the cooling water flowing in this cooling water passage 145 means that the number of cooling water passages required is kept to a minimum (in particular, by eliminating the need to provide a cooling water passage inside the retainer cap, and the like,) and hence contributes to compactification of the torch. Cooling water flowing out of cooling water passage 145 passes along cooling water passage 147 and is then discharged outside the torch 101.

A ring-shaped secondary gas passage 151 is formed between the base end portion of the retainer cap 113 and the outer sleeve 129. Moreover, a multiplicity of grooves 113C running from the base end portion of the retainer cap 113 to the front end portion thereof are formed on the outer circumference of the retainer cap 113, at predetermined intervals in the circumferential direction thereof, and the outside openings of each groove 113C are covered completely by long thin lids 113D, the space inside the grooves 113C covered by these lids 113D forming secondary gas passages 153. Each of the multiplicity of secondary gas passages 153 inside the retainer cap 113 is connected, via a multiplicity of secondary gas input holes 113E formed in the base end portion of the retainer cap 113, to the ring-shaped secondary gas passage 151 between the retainer cap 113 and the outer sleeve 129. Each of the multiplicity of secondary gas passages 151 inside the retainer cap 113 is also connected, via a plurality of secondary gas emission holes 113F formed in the front end portion of the retainer cap 113, to a ring-shaped secondary gas passage 155 formed between the retainer cap 113 and the shield cap 111. This ring-shaped secondary gas passage 155 is connected to a plurality of secondary gas swirler holes 111C provided at predetermined intervals about the circumference of the shield cap 111, at a slight angle in the circumferential direction with respect to the radial direction thereof. These secondary gas swirler holes 111C are connected to a secondary gas passage 157 formed between the shield cap 111 and the front end portion of the nozzle 107, and this secondary gas passage 157 is connected to a secondary gas emission outlet 111B, having a larger diameter than the nozzle orifice 107A, formed in the front end of the shield cap 111.

Secondary gas flows into the secondary gas passage 151 from a secondary gas supply path (not illustrated) which is formed within the outer sleeve 129, whereupon it passes along the plurality of secondary gas passages 152 inside the retainer cap 113 until it reaches the secondary gas passage 155 between the front end portion of the retainer cap 113 and the shield cap 111. Here, the secondary gas then passes through the plurality of secondary gas swirler holes 111C which pass from the outer side to the inner side of the shield cap 111, thereby forming a swirling current, which is emitted into the secondary gas passage 157 inside the shield cap 111. The swirling current of secondary gas passes through the secondary gas passage 157 and is emitted from the secondary gas emission outlet 111B in the vicinity of the plasma arc emitted from the nozzle orifice 107A. The direction of rotation of the swirling current of secondary gas created by the secondary gas swirling holes 111C is the same as the direction of rotation of the swirling current of the plasma arc (plasma gas) created by the plasma gas swirler holes 105A.

A tertiary gas passage 161 for supplying tertiary gas is formed in the fixed ring 137. This tertiary gas passage 161 is connected to a ring-shaped tertiary gas passage formed between the fixed ring 137 and the retainer cap 113. Moreover, in addition to the secondary gas passages 153 described above, the retainer cap 113 is provided with a multiplicity of tertiary gas passages 165, similarly constituted by grooves 113G and lids 113H, which run from the base end portion to the front end portion thereof, the tertiary gas passages 165 and secondary gas passages 153 being provided respectively in an alternating fashion. The base ends of this plurality of tertiary gas passages 165 are connected, via a multiplicity of tertiary gas input holes 113I formed in the base end of the retainer cap 113, to a ring-shaped tertiary gas passage 163 between the fixed ring 137 and the retainer cap 113. Furthermore, the front ends of this multilicity of tertiary gas passages 165 are connected to a plurality of tertiary gas swirler holes 113J provided in the front end portion of the retainer cap 113. These tertiary gas swirler holes 113J are provided at predetermined intervals about the circumference of the retainer cap 113, at a slight angle towards the circumferential direction with respect to the radial direction thereof, in such a manner that the tertiary gas swirls in the same direction as the secondary gas, and the outlets of these holes open into a ring-shaped tertiary gas passage 167 surrounding the front end portion of the shield cap 111.

Tertiary gas is input from the tertiary gas passage 161 inside the fixed ring 137 to the tertiary gas passage 163 between the fixed ring 137 and the retainer cap 113, whereupon it passes along the plurality of tertiary gas passages 165 in the retainer cap 113 until it reaches the tertiary gas swirler holes 113J at the front end portion of the retainer cap 113, where the tertiary gas is formed into a swirling current via the tertiary gas swirler holes 113J and is emitted in the vicinity of the swirling current of secondary gas.

As described above, since a secondary gas passage 153 and a tertiary gas passage 165 are formed inside the retainer cap 113, it is not necessary to provide passages for secondary gas and tertiary gas between the retainer cap 113 and the nozzle 107. As a result of this, the whole of the space between the nozzle 107 and the retainer cap 113 can be used as a cooling water passage 145, and consequently, the nozzle 107, retainer cap 113 and shield cap 111 can be cooled simultaneously by the same single cooling water passage 145, as described above, thereby bringing merits in that surplus cooling water passages are not required and the device can therefore be compactified.

The foregoing described the overall composition of the plasma torch 101. Next, the torch main unit 101A and detachable section 101B are described with reference to FIG. 2 and FIG. 3.

As illustrated in FIG. 2, the torch main unit 101A is constituted by a water pipe 17, inner sleeve 117, outer sleeve 129, nozzle seating 131, fixed ring 137 and various components (not illustrated) which are located further towards the base end side of the torch from these components. As FIG. 3 shows, the detachable section 101B is constituted by various components which can be attached to and detached from the torch, such as the electrode 103, insulating guide 105, nozzle 107, shield cap 111, retainer cap 113, and the like.

It should be noted that the torch main unit 101A and the detachable section 101B according to the present invention are definitively different from the composition of a torch main unit and head section in a conventional cassette-type torch, in respect of the following points.

Specifically, in a conventional cassette-type torch, in addition to the standard electrical connecting sections, cooling water pipes and gas pipes provided in the electrode, nozzle and cap contained in the head section, an additional intermediate electrical connecting section, cooling water pipe connecting section and gas pipe connecting section for linking the torch main unit with the head section are provided, and this makes the structure of the cassette-type torch more complex. In the plasma torch 101 based on the principles of the present invention, on the other hand, no additional intermediate electrical connecting section or pipe connecting sections are provided for linking the torch main unit 101A with the detachable section 101B, in addition to the standard electrical connecting section, cooling water pipes and gas pipes provided in the electrode 103, nozzle 107, shield cap 111, and the like, contained in the detachable section 101B.

For example, the torch main unit 101A illustrated in FIG. 2 has the same composition as the completed torch shown in FIG. 1, with the exception that in FIG. 2 the detachable parts, such as the electrode 103, insulating guide 105, nozzle 107, shield cap 111, retainer cap 113, and the like, contained in the detachable section 101B, have been removed individually. In other words, the torch main unit 101A simply has a section for coupling directly to the respective detachable parts, such as the electrode 103, nozzle 107 and retainer cap 113, and apart from the section for direct coupling with these detachable components, it has no additional intermediate electrical connecting sections or pipe connecting sections for the detachable section 101B. Moreover, the detachable section 110B shown in FIG. 3 is substantially constituted only by removable parts, such as the electrode 103, insulating guide 105, nozzle 107, shield cap 111 and retainer cap 113. In other words, with respect to the torch main unit 101A, the detachable section 101B simply comprises the detachable parts, such as the electrode 103, nozzle 107, and retainer cap 113, which couple directly to the torch main unit 101A, but it does not comprise any additional intermediate electrical connecting sections or pipe connecting sections relating to the torch main unit 101A. Moreover, the electrode 103, insulating guide 105, nozzle 107, shield cap 111 and retainer cap 113 in the detachable section 101B themselves constitute cooling water passages and gas passages, and the detachable section 101B is not provided with any additional cooling water pipes or gas pipes apart from these components.

Consequently, this plasma torch 101 is simpler than a conventional cassette-type torch in respect of its structural complexity, and hence it is less expensive. In addition, as described below, the plasma torch 101 is certainly not inferior to, and is indeed superior to, a conventional cassette-type torch, in terms of the ease of exchanging consumable parts, such as the electrode 103, nozzle 107, or the like.

As shown in FIG. 3, in the detachable section 101B, the electrode 103, insulating guide 105, nozzle 107 and shield cap 111 are accommodated inside a retainer cap 113. The electrode 103, insulating guide 105 and nozzle 107 are mutually coupled, and they can be separated individually from each other by pulling them apart, one from the other, in the axial direction thereof. The coupling force between the electrode 103 and the insulating guide 105 is principally obtained by means of the frictional force of an elastic O-ring 193, made from rubber, or the like, which is inserted between the respective members, and moreover, the coupling force between the insulating guide 105 and the nozzle 107 is principally obtained by means of the frictional force of an elastic O-ring 195 inserted between the respective members. Furthermore, the nozzle 107 and shield cap 111 are fixed together via an insulating ring 109, and they cannot be separated from each other by the user (naturally, the fitting system may also be devised in such a manner that they can be separated.)

The shield cap 111 fits detachably onto the front end portion of the retainer cap 113. A ring-shaped shoulder 113K having an internal diameter slightly larger than the external diameter of a flange 111A on the base end portion of the shield cap 111 is formed on the inner surface of the front end portion of the retainer cap 113, and the flange 111A of the shield cap 111 fits inside this ring-shaped shoulder 113K. At the base portion of the ring-shaped shoulder 113K, the aforementioned ring-shaped hook 113B protrudes in an inward direction, and this ring-shaped hook 113B couples with the flange 111A in the shield cap 111, thereby retaining the shield cap 111. Moreover, an O-ring 197 made of elastic material is fitted to the inner surface of the ring-shaped shoulder 113K in the region above the flange 111A. The internal diameter of this O-ring 197 is slightly smaller than the external diameter of the flange 111A in the shield cap 111, and hence it projects inwards beyond the inner surface of the ring-shaped shoulder 113K. Consequently, the shield cap 111 fitted into the front end portion of the retainer cap 113 is prevented from becoming detached from the retainer cap 113 by means of the O-ring 197. When the shield cap 111 is pulled away from the retainer cap 113 with the necessary force to compress the O-ring 197 and make the flange 111A pass the position of the O-ring 197, then the shield cap 111 detaches from the retainer cap 113.

When a detachable section 101B having the aforementioned composition is installed in the torch main unit 101A and a state is assumed wherein the relative positions thereof are aligned such that the water pipe 115 in the torch main unit 101A leads into the interior of the electrode 103, then the retainer cap 113 should cover the front end portion of the torch main unit 101A, and the rotating ring 139 provided at the base end portion of the retainer cap 113 should be inserted and screwed into the fixed ring 137 provided in the torch main unit 101A. In brief, all of the parts constituting the detachable section 101B are coupled simultaneously to the torch main unit 101A by the simple operation of installing the retainer cap 113 onto the torch main unit 101A. Moreover, when the detachable section 101B installed in the torch main unit 101A is then removed from the torch main unit 101A in order to replace consumable parts, the screw coupling between the fixed ring 137 and rotating ring 139 should be undone, whereupon the retainer cap 113 can be pulled simply from the torch main unit 101A.

In a state where the detachable section 101B is installed on the torch main unit 101A, the electrode 103 is coupled to the inner sleeve 117 by the frictional resistance force generated by a plurality of elastic tongues 177 formed in the base end section 103B of the electrode 103, which make contact with the inner surface of the inner sleeve 117 in the torch main unit 101A. Moreover, the nozzle 107 makes contact with the front end face 131A of the nozzle seating 131 on the torch main unit 101A, at a nozzle base end face 107B which is perpendicular to the axis of the torch. Therefore, when the detachable section 101B is removed from the torch main unit 101A, the only force preventing the detachable section 101B from separating from the torch main unit 101A is the coupling force generated by the aforementioned friction between the electrode 103 and the inner sleeve 117. The various parts are designed in such a manner that the coupling force between the respective components constituting the detachable section 101B is greater than the coupling force between the electrode 103 and the inner sleeve 117. Therefore, if the operation of detaching the retainer cap 113 from the torch main unit 101A is performed, then the electrode 103, insulating guide 105, nozzle 107, shield cap 111, and the like, inside the retainer cap 113 will detach simultaneously, from the torch main unit 101A, whilst still coupled to the retainer cap 113, in other words, the detachable section 101B will be detached in one operation from the torch main unit 101A.

Figure 4:
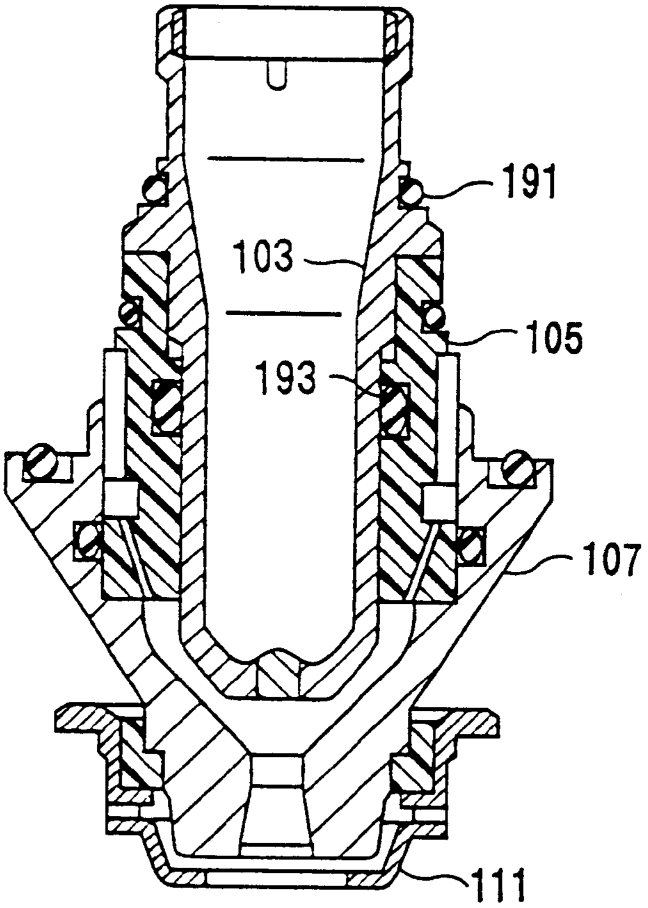
FIG. 4 is a sectional view of a three-component set wherein an electrode, insulating guide and nozzle are coupled together.
Figure 5:
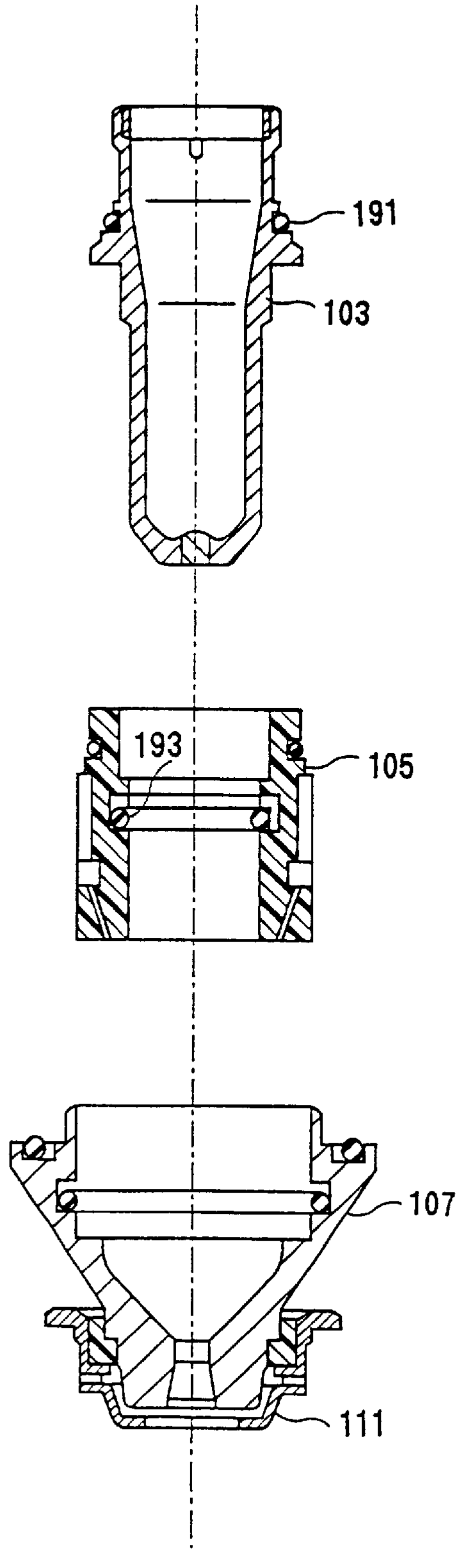
FIG. 5 is a sectional view of a separated electrode, insulating guide and nozzle.

The operation of separating individual parts from the detachable section 101B is very straightforward. Since all of the parts couple together by means of a simple interlocking action, they can be separated simply by pulling them apart in the axial direction thereof. The procedure by which parts are separated is at the discretion of the user, but typically, they are separated by means of the following procedure. Firstly, the user firmly holds the outer side of the retainer cap 113, to which the electrode 103, nozzle 107, and the like, are attached internally as shown in FIG. 3, and then the user presses the shield cap 111 exposed at the front end of the retainer cap 113, in the upward direction of FIG. 3. By means of this pressing force, the flange 111A in the shield cap 111 rides up over the O-ring 197, thereby detaching the shield cap 111 from the retainer cap 113. Therefore, the coupled unit comprising the electrode 103, insulating guide 105 and nozzle 107 illustrated in FIG. 4 (hereinafter, called the three-component set), is detached from the retainer cap 113. Since the shield cap 111 is fixed to the front end portion of the nozzle 107, in the following description, it is regarded as a portion of the nozzle 107. Next, when the electrode 103, insulating guide 105 and nozzle 107 are pulled apart along the axial direction thereof, the individual parts 103, 105, 107 respectively separate from each other, as shown in FIG. 5. In order to assemble the detachable section 101B, the reverse of the foregoing procedure should be followed. In other words, the detachable section 101B is assembled simply by pushing together the electrode 103, insulating guide 105, nozzle 107 and retainer cap 113, thereby caused them to interlock mutually.

The disassembly and assembly operations for the detachable section 101B described above are simpler to perform than the corresponding operations for the head section of a conventional cassette-type torch. The head section of a conventional cassette-type torch is provided with intermediate components for providing electrical connection and piping connection with the torch main unit 101A, in addition to the essential components of the torch, such as the electrode, nozzle, caps, and the like, and therefore the disassembly and assembly operations are not as simple as those for the detachable section 101B described above.

The O-rings 191, 193, 195, 197 for coupling the electrode 103, insulating guide 105, nozzle 107 and retainer cap 113 can be replaced by other components having similar functions. For example, it is possible to use a plate spring or rubber leaf in place of the O-ring 197 for the retainer cap 113.

Figure 6:
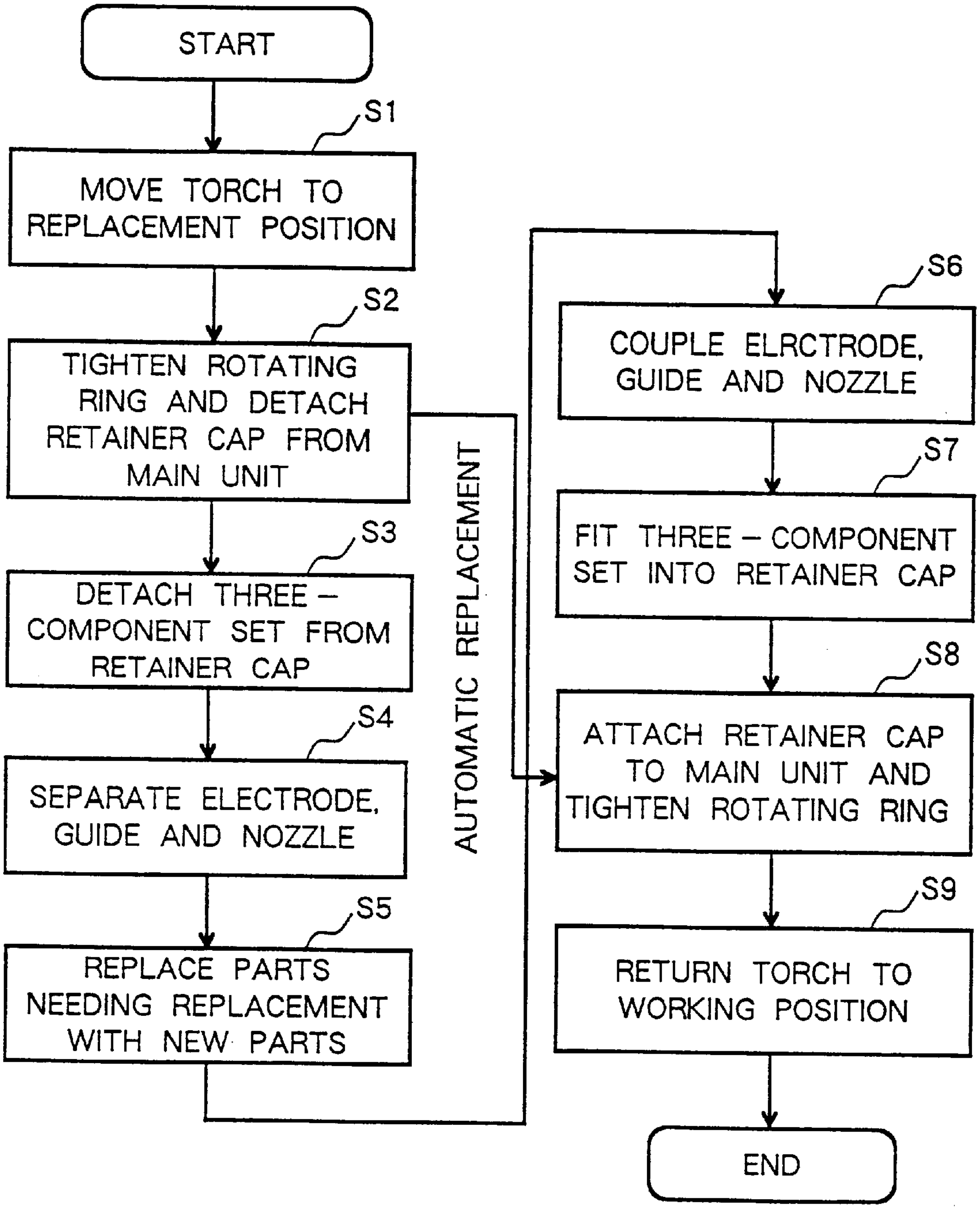
FIG. 6 is a flowchart illustrating a procedure for exchanging consumable parts.

FIG. 6 shows one example of a procedure for changing consumable parts of a plasma torch 101 according to the present invention described above.

Firstly, the plasma torch 101 is moved to a predetermined replacement position in the plasma machine tool (S1). Thereupon, the rotating ring 139 of the plasma torch 101 is turned and loosened, and the retainer cap 113 is detached from the torch main unit 10A (S2). As described previously, all the parts in the detachable section 101B detach simultaneously with the retainer cap 113. Thereupon, the three-component set comprising the electrode 103, insulating guide 105 and nozzle 107 accommodated inside the retainer cap 113 are removed from the retainer cap 113 (S3). Next, the electrode 103, insulating guide 105 and nozzle 107 are separated from the three-component set (S4).

The component of the separated electrode 103, insulating guide 105 and nozzle 107 which needs replacing is then replaced by a new part (S5). Thereupon, the electrode 103, insulating guide 105 and nozzle 107 are coupled to reform the three-component set (S6). The three-component set is fitted into the retainer cap 113 (S7). Thereby, a detachable section 101B in which the consumable part has been replaced is achieved. Next, the retainer cap 113 of the detachable section 101B is placed over the front end portion of the torch main unit 101A and the rotating ring 139 is turned until it is tightened fully (S8). Thereby, the replacement operation is completed. The torch 101 is returned to the working position and processing work commences (S9).

Figure 7:
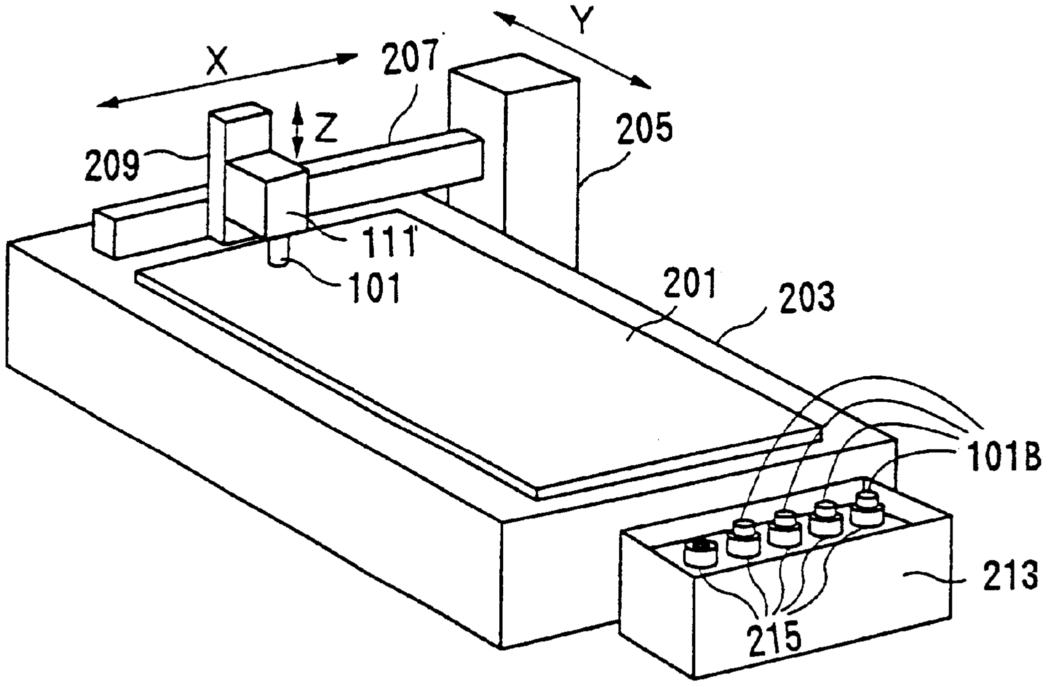
FIG. 7 is an oblique view of a plasma cutting device relating to one embodiment of the present invention, which is provided with an automatic consumable parts exchanging device.

All of the replacement operations described above can be performed manually, but it is also possible to carry out these tasks in a fully automatic or semi-automatic fashion, by using an automatic consumable parts replacement device. FIG. 7 shows the general composition of a plasma machine tool provided with an automatic consumable parts replacement device.

A work piece 201, which is a steel plate, is positioned horizontally on a working stage 203. A Y carriage 205 is disposed in such a manner that it can be moved horizontally in a Y direction with respect to the working stage 203. A guide rail 207 extends outwards from the Y carriage 205 and an X carriage 209 is capable of moving horizontally in an X direction, on top of this guide rail 207. A Z carriage 211 which moves in the Z (vertical direction) is attached to the X carriage 209, and a plasma torch 101 having the structure illustrated in FIG. 1 is fixed to this Z carriage 211, in a directly downward-facing attitude. When cutting (or welding) the work piece 201, the plasma torch 101 is moved horizontally in the X and Y directions along a cutting (or welding) line conforming to the shape of the product, by means of the XYZ movement system constituted by the aforementioned carriages 205, 209, 211, whilst being maintained at a predetermined stand-off from the work piece.

An automatic consumable parts replacement device 213 is located in a predetermined position at the edge of the working stage 203. The aforementioned XYZ movement system is capable of moving the plasma torch 101 to the location of the automatic consumable parts replacement device 213, as well as over the working table 203. A plurality of detachable section holders 215, 215, . . . are provided on the upper portion of the automatic consumable parts replacement device 213, and one detachable section 101B can be set, with the front end portion thereof facing downwards, in each of the detachable section holders 215. Each of the detachable section holders 215 has the function of detaching the detachable section 101B (in other words, the retainer cap 113) from the plasma torch 101 and attaching a detachable section 101B (in other words, the retainer cap 113) to the plasma torch 101, by means of the method described previously. A detachable section 101B having new consumable parts is previously set in at least one of the detachable section holders 215, and at least one of the other detachable section holders 215 is empty.

When replacing consumable parts in the plasma torch 101, firstly, the XYZ movement system moves the plasma torch 101 to a position directly above the empty detachable section holder 215 in the automatic consumable parts replacement device 213, whereupon the plasma torch 101 is lowered and the detachable section 101B thereof is set in the empty detachable section holder 215. Next, the detachable section holder 215 is operated, whereby the rotating ring 139 of the plasma torch 101 is loosened and the detachable section 101B only is removed.

Next, the XYZ movement system raises up the plasma torch main unit 101A from which the detachable section 101B has been removed, moves it to a position directly above a detachable section holder 215 in which a separate detachable section 101B containing new consumable parts is set, and then lowers the torch main unit 101A, thereby interlocking same with the detachable section 101B containing new consumable parts. Next, the detachable section holder 215 is operated, thereby turning the rotating ring 139 of the detachable section 101B interlocked with the torch main unit 101A, and fixing the detachable section 101B to the torch main unit 101A. With this, the replacement operation is completed. Thereupon, the XYZ movement system raises up the plasma torch 101 in which parts replacement has been completed, and returns it once again to a work position over the working table 203, whereupon processing work is recommenced.

With respect to the replacement procedure illustrated in FIG. 6, the aforementioned automatic replacement operation by means of the automatic consumable parts replacement device 213 proceeds from step S2 to step S8, bypassing steps S3–S7. Steps S3–S7 (the tasks of removing an old detachable section 101B from the detachable section holder 215, disassembling same, assembling a new detachable section 101B and setting same in a detachable section holder 215) may be carried out manually or they may be automated.

FIG. 8 gives a simple illustration of the composition of a detachable section holder 215 in the automatic consumable parts replacement device 213 (the internal components of the torch 101 are omitted from this diagram).

The detachable section holder 215 comprises a cap holder 217 for holding the retainer cap 113 of the detachable section 101B in a motionless state, and a rotating ring driver 219 for grasping and operating the rotating ring 139 of the detachable section 101B. The cap holder 217 is a cylindrical component provided immovably in the automatic consumable parts replacement device 213, and it attaches to the outer surface of the front end portion of the retainer cap 113 and holds the retainer cap 113 in a motionless state during the replacement operation. The rotating ring driver 219 is a cylindrical component disposed about the outer circumference of the cap holder 217, coaxially with respect to same, and it is capable of gripping the rotating ring 139 and causing the rotating ring 139 to rise or descend in the direction of the torch axis, by turning it in a rightward or leftward direction with respect to the torch axis (indicated by single dotted line). The driving mechanism for the rotating ring driver 219 is not illustrated in the diagram.

Figure 8B:
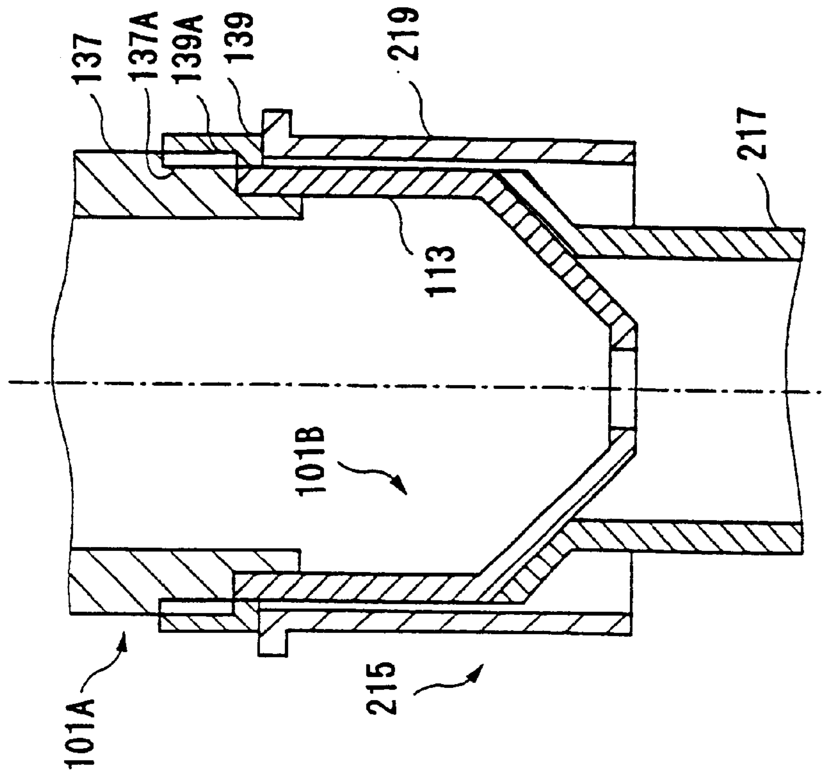
FIG. 8 is a sectional view of the principal portion of an automatic consumable parts exchanging device.
Figure 8A:
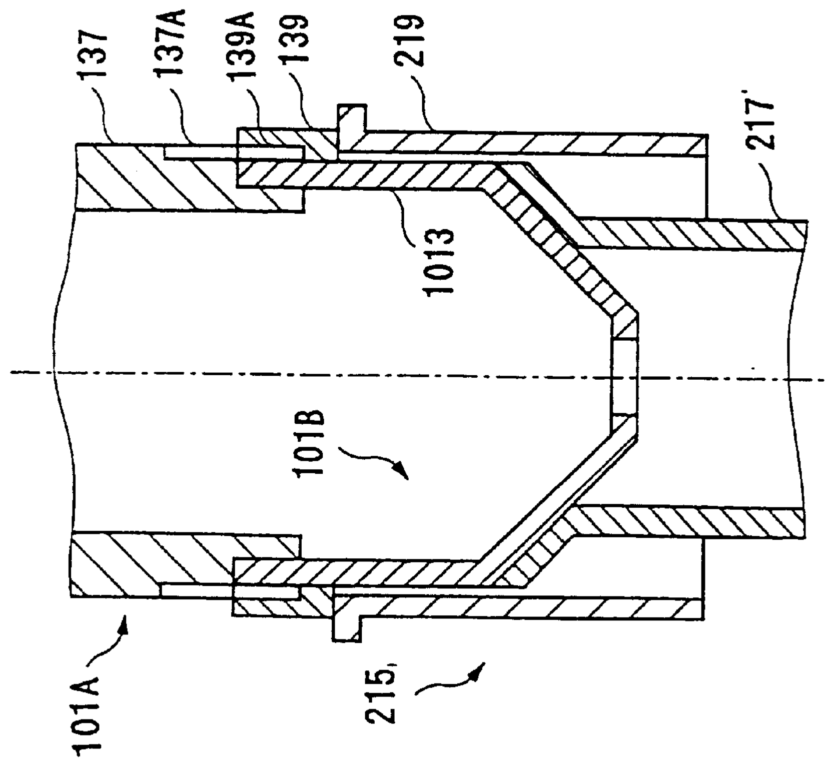

FIG. 8A shows a state immediately before the detachable section 101B is fixed to the torch main unit 101A. Here, the rotating ring driver 219 holds the rotating ring 139 of the detachable section 101B in a low position where it does not project above the retainer cap 113. In this state, the torch main unit 101A interlocks completely with the detachable section 101B, without impacting against the rotating ring 139. Thereupon, the rotating ring driver 219 causes the rotating ring 139 to turn in a rightward direction, thereby causing the rotating ring 139 to rise upwards at a ratio of rotational speed/vertical speed corresponding to the pitch of the screw thread 139A of the rotating ring 139. Thereby, the rotating ring 139 screws into the fixed ring 137 in the torch main unit 101A and this screw coupling becomes tightly fastened. When the screw coupling between the rotating ring 139 and fixed ring 137 is fastened completely, as illustrated in FIG. 8B, the rotating ring driver 219 halts. Thereby, the operation of installing the detachable section 101B on the torch main unit 101A is completed.

When detaching the detachable section 101B from the torch main unit 101A, from the state in FIG. 8B, the rotating ring driver 219 causes the rotating ring 139 to turn in a rightward direction, thereby causing the rotating ring 139 to descend at a ratio of rotational speed/vertical speed corresponding to the pitch of the screw thread 139A on the rotating ring 139. Thereby, the screw coupling between the rotating ring 139 and the fixed ring 137 is loosened. When the fixed ring 137 is removed completely from the rotating ring 139, as illustrated in FIG. 8A, then the rotating ring driver 219 is halted. Thereupon, the torch main unit 101A is raised up, thereby separating the detachable section 101B from the torch main unit 101A.

As described above, the operation of replacing consumable parts in a plasma torch 101 according to the present invention is simple to perform and may also be applied to automatic replacement.

The plasma torch 101 according to the present invention has excellent features with regard to a number of points apart from the replacement of consumable parts. Features relating to two aspects are described below, in other words, firstly, features relating to electrical connection of the electrode 103 and, secondly, features relating to positioning of the electrode 103 and nozzle 107. The first features are now described.

Figure 9:
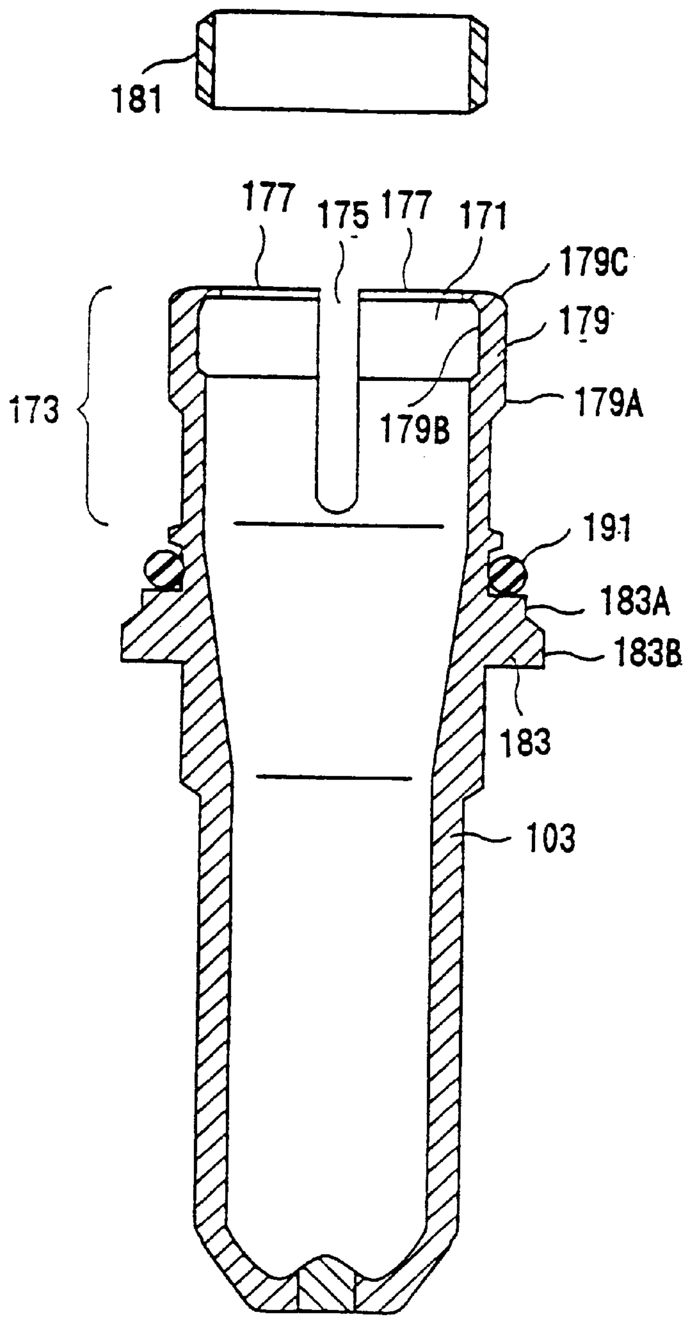
FIG. 9 is a sectional view of an electrode.
Figure 10:
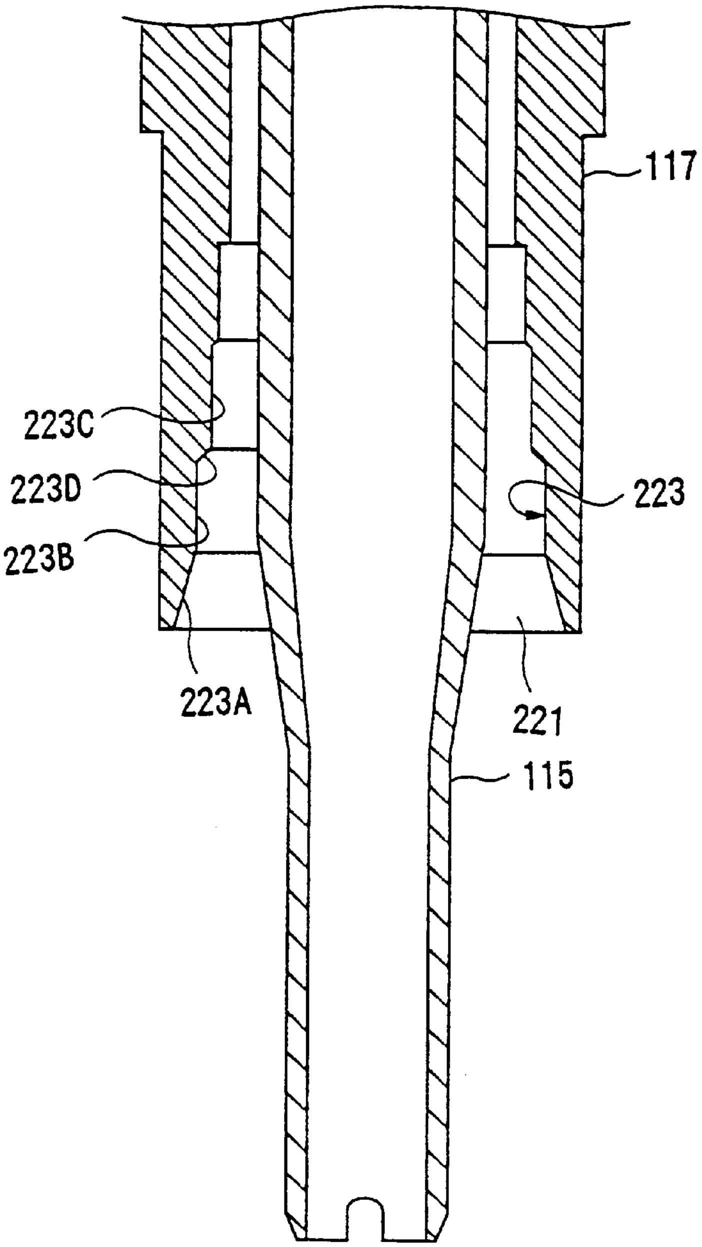
FIG. 10 is a sectional view of a portion of a torch main unit where an electrode is installed.
Figure 11:
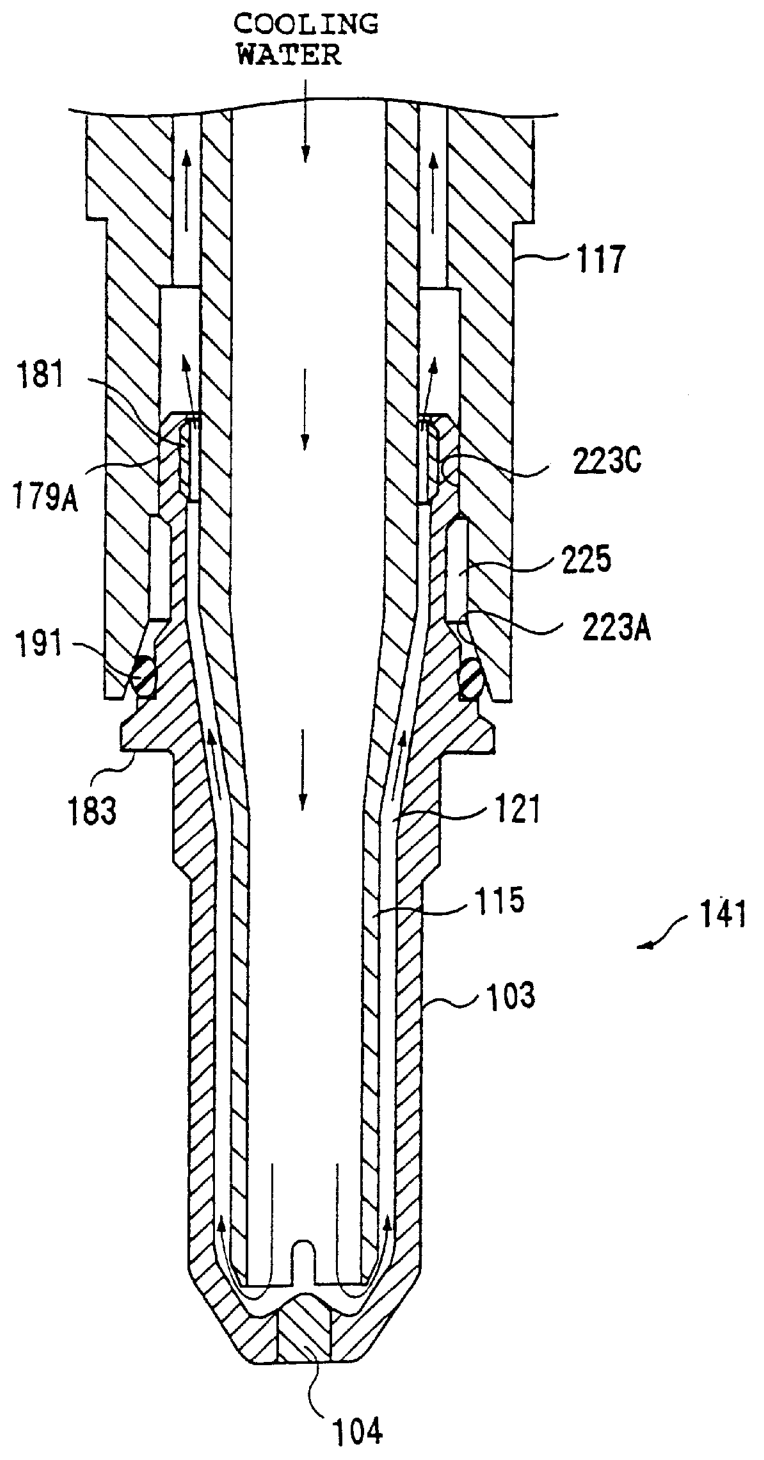
FIG. 11 is a sectional view of a portion of a torch main unit where an electrode is installed.

FIG. 9 shows a sectional view of an electrode 103 of the aforementioned plasma torch 101. FIG. 10 shows a sectional view of an inner sleeve 117 and water pipe 115 of the torch main unit 101A. FIG. 11 shows a state where the electrode 103 is installed on the inner sleeve 117.

As illustrated in FIG. 9, the electrode 103 is made from copper, or the like, and a plurality of (for example, two, three or four) slits 175 having a predetermined length and predetermined width are cut at predetermined intervals into a skirt section 173 surrounding the based end opening 171 of the electrode 103, from the base end face thereof in a parallel direction to the axis of the electrode. By means of these slits 175, the skirt section 173 is divided into a plurality of (for example, 2, 3 or 4) tongues (curving rectangular strips) 177, each of these tongues having elasticity and being capable of deforming by a small distance in the inward radial direction-. The skirt section 173 comprises a large diameter section 179 having an inner diameter and outer diameter which are both larger than the other portions of the electrode 103, the outer diameter of this large diameter section 179 being compressed slightly when the tongues 177 deform elastically towards the inside. The outer circumference 179A of the large diameter section 179 is parallel to the axis of the electrode, and as described later, it functions as an electrical connection surface by fitting tightly with the inner surface of the inner sleeve 117. A stainless steel spring ring 181 fits inside the large diameter section 179, in such a manner that it makes tight contact with the inner circumference 179B of the large diameter section 179. Although not illustrated in the diagram, this spring ring 191 is not a complete ring, but rather is C-shaped, having a slit cut therein at one point, and it serves to provide additional elastic force to the inside of the copper tongues 177, which do not have great elasticity in themselves, thereby preventing the tongues 177 from undergoing plastic deformation when deformed towards the inner side, and strengthening the contact pressure of the electrical connection surface 179A against the inner surface of the inner sleeve 117. The outer edge of the base end of the large diameter section 179 has an oblique rounded surface 179C, which facilitates the task of inserting the electrode 103 into the inner sleeve 117.

A flange 183 is formed on the outer circumference of the electrode 103 in a position slightly removed towards the front end from the skirt section 173. The flange 183 has a small diameter section 183A having a comparatively small external diameter in the portion thereof towards the base end of the electrode, and a large diameter section 183B having a comparatively large external diameter in the portion towards the front end. The aforementioned O-ring 191 made from elastic material fits about the outer circumference of the electrode 103, in a position between the skirt section 173 and the flange 163. This O-ring 191 confronts the end face of the base end portion of the flange 183 (this face being perpendicular to the electrode axis).

As illustrated in FIG. 10, the inner sleeve 117 serves to retain the electrode 103 and to supply electrical current to the electrode 103.

A space 221 is formed between the outer circumference of the water pipe 115 and the inner circumference of the inner sleeve 117, in order to fit in the base end portion via the flange 183 of the electrode 103. The inner circumference 223 of the inner sleeve 117 has a tapered surface 223A at the front end portion thereof, whereby the inner diameter tapers from the front end towards the base end side. The diameter of the most open portion of this tapered face 223A, in other words, the internal diameter of the front end of the inner sleeve 117, is slightly larger than the external diameter of the small diameter section 183A of the flange 183 in the electrode 103. On the inner circumference 223 of the inner sleeve 117, from the front end to the base end side, a surface 223B parallel to the sleeve axis is formed after the tapered surface 223A, and then a second surface 223C parallel to the sleeve axis is formed having a slightly smaller internal diameter. As described later, this second parallel surface 223C is an electrical connection surface which makes tight contact with the outer circumference 179A of the large diameter section 179 of the electrode skirt section 173, when the electrode 103 is installed on the inner sleeve 117. The internal diameter of the second parallel surface 223C is slightly smaller than the external diameter of the large diameter section 179 of the electrode skirt section 173. Moreover, the edges of the front end side of the second parallel surface 223C are formed as a chamfered sloping surface 223D, in order that the internal diameter reduces in a smooth manner. When the electrode 103 is inserted into the inner sleeve 117, this sloping surface 223D confronts the chamfered surface 179C on the outer edge of the base end of the electrode skirt section 173, causing the tongues 177 to deform in an inward direction, and hence facilitating the task of inserting the large diameter section 179 of the electrode skirt section 173 inside the second parallel surface 223C.

When the portion of the electrode 103 to the base end side from the flange 183 is inserted into the space 221 on the inner side of the inner sleeve 117, the chamfered surface 179C at the outer edges of the base end of the electrode skirt section 173, firstly, confronts the sloping face 223D of the sleeve inner circumference 223, and then enters further inside the sleeve as it passes along the sloping face 223D. In this case, the tongues 177 in the electrode skirt section 173 deform towards the inside, and the large diameter section 179 of the skirt section 173 is compressed in such a manner that it enters inside the second parallel surface 223C of the sleeve inner circumference 223, whereupon the outer circumference (electrical connection surface) 179A of the large diameter section 179 in the electrode skirt section 173 is pressed against the second parallel surface (electrical connection surface) 223C on the sleeve inner circumference 223, due to the reactive force of the tongues 177 and the ring spring 181, and these two electrical connection surfaces 179A, 223C rub against each other whilst the large diameter section 179 of the electrode skirt section 173 enters inside the second parallel surface 223C of the sleeve inner circumference 223. When the electrode 103 is inserted completely inside the inner sleeve 117, the state illustrated in FIG. 11 is assumed, and the operation of inserting the electrode 103 into the inner sleeve 117 is completed. In this way, it is possible to install the electrode 103 in the inner sleeve in a straightforward manner, simply by inserting the electrode 103 in the axial direction thereof, and furthermore the electrode 103 can be detached simply by pulling it away in the axial direction. Therefore, the simple replacement task for consumable parts described above can be achieved.

In the completed installed state illustrated in FIG. 11, the cooling water exits from the water pipe 115 as indicated by the arrow, and firstly, it cools the heat-resistant insert 104, whereupon it is reversed and passes along cooling water passage 121 between the outer circumference of the cooling water pipe 115 and the inner circumference of the electrode 103, thereby cooling the electrode 103 whilst flowing back towards the based end side. This cooling water passage 121 passes in the vicinity of the electrical connection surfaces 179A and 223C on the electrode 103 and inner sleeve 117. Thereupon, a portion of the cooling water inside the cooling water passage 121 enters into the slits 175 in the electrode skirt section 173, passing through the slits 175 and filling up the space 225 formed between the outer circumference of the electrode 103 and the inner circumference of the inner sleeve 117 (in other words, the slits 175 and space 225 also constitute a portion of the cooling water passage.) Therefore, the tightly contacting electrical connection surfaces 179A, 223C are surrounded completely by cooling water. In other words, the tightly contacting electrical connection surfaces 179A, 223C are located within cooling water passages 221, 175 and 225. Moreover, the O-ring 191 on the electrode 103 is held between the flange 183 on the electrode 103 and the tapered surface 223A of the inner sleeve 117, thereby forming a seal which prevents cooling water inside the space 225 from leaking externally. The O-ring 191 also serves to register the position of the electrode 103 in the axial direction.

Even if some foreign matter becomes attached to the electrical connection surfaces 179A, 223C, during the electrode installation process described above, it is still possible to ensure satisfactory connection between the electrical connection surfaces 179A, 223C. Specifically, when the electrode 103 is inserted into the inner sleeve 117, the electrical connection surfaces 179A, 223C of the electrode 103 and inner sleeve 117 are caused to rub against each other, due to the movement of the electrode 103 in the axial direction with respect to the inner sleeve 117. By means of this rubbing action, any quantity of foreign matter which has adhered to the electrical connection surfaces 179A, 223C will be crushed and embedded inside the electrical connection surfaces. Therefore, in the completed installed state illustrated in FIG. 11, the electrical connection surfaces 179A, 223C are pressed together by the tongues 177 and ring spring 181 and they make tight mutual contact. Furthermore, even supposing that some foreign matter remains uncrushed, depending on the type of foreign matter, it will not occur a contact fault arises across the whole region of the electrical connection surfaces 179A, 223C, but rather, the electrical connection surfaces 179A, 223C will make tight contact at one of the plurality of tongues 177 in the electrode skirt section 173, other than the tongue where foreign matter is present. In this way, a contact fault is not liable to occur, whatever the amount of foreign matter present on the electrical connection surfaces. Moreover, whatever the amount of heat generated at the electrical connection surfaces due to contact resistance between the electrical connection surfaces, no problems of melting of the electrical connection surfaces will arise, because the electrical connection surfaces are efficiently cooled by the flow of cooling water in their vicinity.

In order to obtain pressing force for ensuring tight contact between the electrical connection surfaces, tongues 177 which deform elastically are provided on the electrode 103, but it is not necessary to adopt this composition only, and the elastic deforming region may be provided on the inner sleeve 117, or on both the electrode 103 and the inner sleeve 117. However, there is a merit to providing the elastic deforming section on electrode 103, which is frequently replaced, in that this avoids problems of metal fatigue due to repeated deformation. Moreover, above, the electrical connection surfaces of the electrode 103 and inner sleeve 117 were cylindrical in shape, having a common central axis with the central axis of the electrode (central axis of the torch), but this shape does not necessarily have to be adopted, and conical shaped surfaces having a common central axis with the central axis of the torch may also be employed (in other words, the electrical connection surfaces may have a taper.) Moreover, in addition to the electrical connection surfaces which make tight contact due to elastic force as described above, it is also possible to provide electrical connection surfaces which are perpendicular to the torch axis and make contact by pressing force acting along the torch axis. In this case, by providing two sets of electrical connection surfaces, reliability with regard to electrical connection faults is improved, and moreover, in the same size of electrode, it is possible to pass a larger current compared to an electrode which has only one set of electrical connection surfaces.

Next, features relating to positional registration of the electrode 103 and nozzle 107 will be described.

Figure 12:
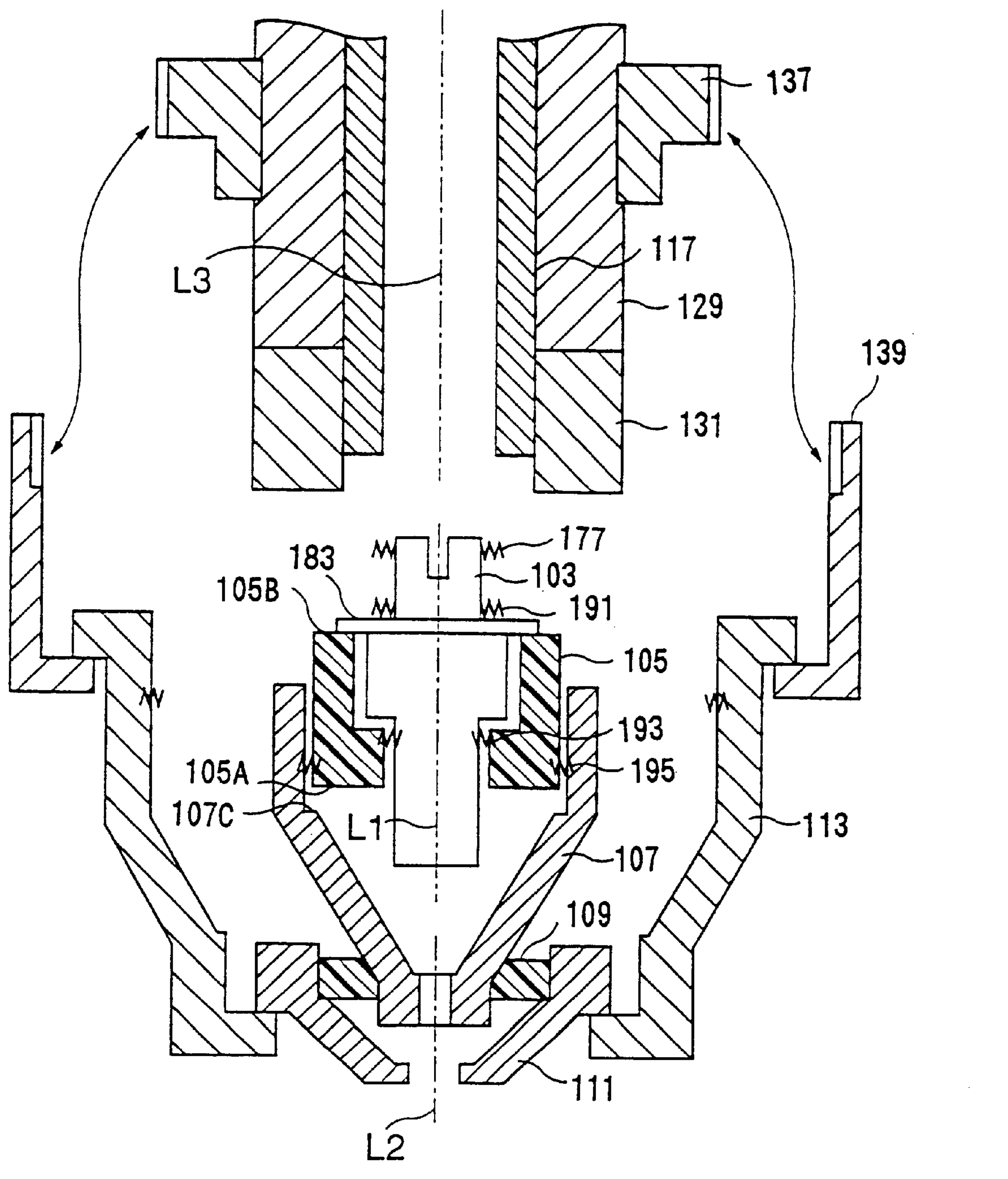
FIG. 12 is a schematic sectional view showing the principle of the position regulating action for the electrode and nozzle.

FIG. 12 shows a disassembled view of the electrode 103 and nozzle 107 in order to give a simple schematic illustration of the principles for positioning these parts (in other words, aligning the central axes, or centring.) In FIG. 12, the O-rings 191, 193, 195 are indicated by zigzag symbols, similar to a spring, in order to illustrate the positional adjustment functions that they each provide due to their elasticity.

The insulating guide 105 interlocks with the inner side of the nozzle 107 via the elastic O-ring 196, and the electrode 103 interlocks with the inner side of the insulating guide 105 via the elastic O-ring 193. The electrode 103 also interlocks with the inner side of the inner sleeve 117, the electrode 103 and inner sleeve 117 making contact by means of the elastic tongues 177 provided in the base end portion of the electrode, and via the elastic O-ring 191 provided at the front end portion of the inner sleeve.

The O-rings 191, 193, 195 each have approximately equal properties in terms of compressive strength, throughout their respective circumferences. Therefore, when the electrode 103 and insulating guide 105 are interlocked together, with the O-ring 193 being held therebetween, due to the properties of the O-ring 193, the central axis L1 of the electrode 103 and the central axis of the insulating guide 105 are automatically caused to align mutually, in a precise manner. Moreover, when the insulating guide 105 and the nozzle 107 are interlocked mutually, with the O-ring 195 being held therebetween, due to the properties of the O-ring 195, the central axis of the insulating guide 105 and the central axis L2 of the nozzle 107 are automatically caused to align mutually, in a precise manner. Consequently, the central axis L1 of the electrode 103 and the central axis L2 of the nozzle 107 are automatically caused to align with each other, in a precise manner. Next, when the electrode 103 is interlocked with the inner sleeve, with the O-ring 191 being held therebetween, due to the properties of the O-ring 191, the central axis L3 of the inner sleeve (in other words, the central axis of the torch main unit) and the central axis L1 of the electrode 103 are automatically caused to align with each other. Consequently, the central axis L1 of the electrode 103, the central axis L2 of the nozzle 107, and the central axis L3 of the torch main unit are automatically caused to align with each other, in a precise manner.

Moreover, as illustrated in FIGS. 1, 3, 11, and so on, the O-rings 191, 193, 195 are respectively accommodated inside O-ring grooves formed on the outer circumference or inner circumference of the respective components. The degree to which the trough portions of these O-ring grooves are coaxial significantly affects the aforementioned centring operation, and therefore, desirably, accuracy should be raised to the order of 0.02 mm (incidentally, in a conventional general torch, the degree of coaxiliaty in the O-ring troughs is approximately 0.05 mm).

The retainer cap 113 is fixed to the fixed ring 137 of the torch main unit by the rotating ring 139 whilst the shield cap 111 at the front end of the nozzle 107 is held against the front end of the retainer cap 113. In this case, the retainer cap 113 simply provides a pressing force on the nozzle 107 in a parallel direction to the aforementioned central axes L1–L3, but it does provide any force in the radial direction or in the rotational direction. Moreover, the nozzle 107 is pressed against the nozzle seating 131 by the retainer cap 113, but since the confronting faces of the nozzle 107 and nozzle seating 131 are perpendicular with respect to the axial direction, the nozzle 107 simply receives a reactive force in the axial direction from the nozzle seating 131, but does not receive any force in the radial direction. In this way, there are no parts present on the outer side of the nozzle 107 which impart forces on the nozzle 107 in any direction other than the axial direction, particularly the radial direction. In other words, the nozzle 107 assumes a free state, without being affected by external forces in the radial direction, other than the forces imparted by the O-rings 191, 193 and 195. Alternatively stated, the nozzle 107 assumes a free state, in such a manner that it allows the positional adjusting action due to the O-rings 191, 193 and 195 in the radial direction. Therefore, the positional adjusting action due to the O-rings 191, 193, 195 works effectively, without being impeded by external forces acting in the radial direction. In this way, a high-precision radial positioning (in other words, central axis aligning) of the electrode 103 and nozzle 107 can be performed efficiently by means of the O-rings 191, 193, 195, without any interference by external forces.

On the other hand, positioning of the nozzle 107 and the electrode 103 in the axial direction is achieved, by means of the step section 107C on the inner circumference of the nozzle 107, the flange 183 on the electrode 103, and the dimensions of the insulating guide 105 inserted between the step section 107C and the flange 183. In other words, the front end face 105A of the insulating guide 105 confronts the step section 107C on the inner circumference of the nozzle 107 and the base end face 105B of the insulating guide 105 is pressed by the flange 183 of the electrode 103. Accordingly, the distance between the step section 107C of the nozzle 107 and the flange 183 of the electrode 103 in the axial direction is determined by the length of the insulating guide 105 in the axial direction, and therefore the relative positions of the nozzle 107 and electrode 103 in the axial direction are determined automatically in a precise manner.

Moreover, it is important to note with respect to the principles of positional adjustment illustrated in FIG. 12 that a sufficiently large clearance is allowed at the boundaries between the various components into which the O-rings 191, 193 and 195 are inserted, in order to give sufficient allowance for positional adjustment in the radial direction by means of the O-rings 191, 193 and 195. In other words, there are large clearances between the inner circumference of the front end portion of the inner sleeve 117 and the outer circumference of the base end portion of the electrode 103, between the outer circumference of the front end portion of the electrode 103 and the inner circumference of the insulating guide 105, and between the outer circumference of the front end portion of the insulating guide 105 and the inner circumference of the base end portion of the nozzle 107, in order that these respective components do not contact each other directly. These clearances enable the radial position adjusting action by the O-rings 191, 193, 195 to work efficiently, and they also allow the components to be separated from each other readily and fitted together readily, thereby facilitating the replacement operation. In addition, since the O-rings 191, 193, 195 have a circular cross-section, they do not create significant resistance when components are separated from each other or fitted together, and this factor also facilitates the replacement operation.

The aforementioned O-rings 191, 193, 195 are not limited to those described above. As an alternative, members having elasticity corresponding to the O-rings may be used. Alternatively, in place of ring-shaped members which exist in a continuous circular fashion about the inner circumference or outer circumference of the components, as in the case of the O-rings, it is also possible to use a plurality of elastic blocks disposed in a plurality of locations about the inner circumference or outer circumference of the components, positional adjustment in the radial direction being achieved by means of uniform elastic expansion and compression of the elastic blocks in their respective plurality of positions about the circumference of the components.

Above, the present invention was described on the basis of an embodiment, but the present invention is clearly not limited to this embodiment.

What is claimed is:

1. A plasma cutting device comprising: a plasma torch, a working table, and a movement mechanism for moving said plasma torch on said working table, wherein:

said plasma torch comprises a torch main unit installed on said movement mechanism, and a detachable section installed detachably on said torch main unit;

said detachable section comprises: an electrode; a nozzle disposed in such a manner that it surrounds said electrode; an insulating member interposed between said electrode and said nozzle; and a retainer cap inside which said electrode, nozzle and insulating member are accommodated;

said torch main unit comprises: an electrode connecting section for coupling with said electrode; a nozzle connecting section for coupling with said nozzle; a retainer cap connecting section for coupling with said retainer cap; a cooling water pipe; and a plasma gas pipe;

a coupling structure between said electrode and said electrode connecting section and a coupling structure between said nozzle and said nozzle connecting section being formed in such a manner that said electrode and said nozzle couple respectively with said electrode connecting section and said nozzle connecting section, when the operation of bringing said retainer cap close to said retainer cap connecting section along a predetermined path and coupling said retainer cap to said retainer cap connecting section is performed, and furthermore, said electrode and said nozzle detach respectively from said electrode connecting section and said nozzle connecting section, when the operation of detaching said retainer cap from said retainer cap connecting section and moving said retainer cap away from said retainer cap connecting section along a predetermined path is performed; and said electrode, said insulating member, said nozzle, and said retainer cap coupling mutually, the respective coupling force therebetween being stronger than both the coupling force between said electrode and said electrode connecting section and the coupling force between said nozzle and said nozzle connecting section;

whereby all the parts in said detachable section can be installed on said torch main unit and detached from said torch main unit, by installing said retainer cap on said retainer cap connecting section and detaching said retainer cap from said retainer cap connecting section.

2. The plasma processing device according to claim 1, further comprising an automatic exchanging device, disposed in a predetermined position within the movement range of said plasma torch by means of said movement mechanism, for removing said retainer cap from said torch main unit of said plasma torch, and subsequently attaching a separate such retainer cap to said torch main unit.

3. A method for exchanging said electrode or said nozzle in the plasma processing device according to claim 1, comprising the steps of:

moving said plasma torch to an exchanging operation position;

removing all the parts in said detachable section, simultaneously, from said torch main unit, by detaching said retainer cap from said torch main unit of said plasma torch, at said exchanging operation position;

exchanging said electrode or said nozzle in said detachable section for a new component; and attaching all the parts in said detachable section to said torch main unit, simultaneously, by attaching said retainer cap of said detachable section having a new component as said electrode or said nozzle, to said torch main unit, at said exchanging operation position.

4. A plasma torch provided with a torch main unit having cooling water piping and plasma gas piping, and a detachable section installed detachably on said torch main unit;

wherein said detachable section comprises: an electrode; a nozzle disposed in such a manner that it surrounds said electrode; an insulating member interposed between said electrode and said nozzle; and a retainer cap inside which said electrode, nozzle and insulating member are accommodated;

said torch main unit comprises: an electrode connecting section for coupling with said electrode; a nozzle connecting section for coupling with said nozzle; and a retainer cap connecting section for coupling with said retainer cap;

a coupling structure between said electrode and said electrode connecting section and a coupling structure between said nozzle and said nozzle connecting section being formed in such a manner that said electrode and said nozzle couple respectively with said electrode connecting section and said nozzle connecting section, when the operation of bringing said retainer cap close to said retainer cap connecting section along a predetermined path and coupling said retainer cap to said retainer cap connecting section is performed, and furthermore, said electrode and said nozzle detach respectively from said electrode connecting section and said nozzle connecting section, when the operation of detaching said retainer cap from said retainer cap connecting section and moving said retainer cap away from said retainer cap connecting section along a predetermined path is performed;

said electrode, said insulating member, said nozzle, and said retainer cap coupling mutually, the respective coupling force therebetween being stronger than both the coupling force between said electrode and said electrode connecting section and the coupling force between said nozzle and said nozzle connecting section;

whereby all the parts in said detachable section can be installed on said torch main unit and detached from said torch main unit, by installing said retainer cap on said retainer cap connecting section and detaching said retainer cap from said retainer cap connecting section.

5. The plasma torch according to claim 4, wherein said electrode and said nozzle can be separated individually from said retainer cap.

6. The plasma torch according to claim 4, wherein said electrode, said nozzle and said retainer cap are coupled mutually by means of a coupling structure using elastic members.

7. The plasma torch according to claim 4, wherein said electrode and said electrode connecting section respectively have electrical connection surfaces which make mutual contact in order to ensure electrical connection between said electrode and said electrode connecting section, the electrical connection surfaces of said electrode and said electrode connecting section making mutual contact under a pressing force imparted by deformation of an elastic deforming section provided in at least one of said electrode and said electrode connecting section.

8. A method for replacing consumable parts in a plasma torch:

said plasma torch comprising a torch main unit having cooling water piping and plasma gas piping, and a detachable section installed detachably on said torch main unit;

wherein said detachable section comprises: an electrode; a nozzle disposed in such a manner that it surrounds said electrode; an insulating member interposed between said electrode and said nozzle; and a retainer cap inside which said electrode, nozzle and insulating member are accommodated; and said torch main unit comprises: an electrode connecting section for coupling with said electrode; a nozzle connecting section for coupling with said nozzle; and a retainer cap connecting section for coupling with said retainer cap;

said method comprising the steps of:

removing all the parts in said detachable section, simultaneously, from said torch main unit, by detaching said retainer cap from said torch main unit of said plasma torch;

exchanging said electrode or said nozzle in said detachable section for a new component; and attaching all the parts in said detachable section to said torch main unit, simultaneously, by attaching said retainer cap of said detachable section, wherein said electrode or said nozzle has been replaced for a new component, to said torch main unit, at said exchanging operation position.

9. A plasma torch comprising:

an electrode for generating an arc; and an electrode seating for retaining said electrode by coupling detachably with said electrode, whilst also supplying an arc current to said electrode by connecting electrically to said electrode;

wherein said electrode and said electrode seating respectively have electrical connection surfaces, said electrode and said electrode seating being electrically connected by means of said electrical connection surfaces making mutual contact; and said electrode seating comprises an elastic member which causes one of said electrical connection surfaces to press against the other on of said electrical connection surfaces, by means of elastic force generated by elastic deformation of said elastic member when said electrode is coupled with said electrode seating.

10. The plasma torch according to claim 9, wherein the electrical connection surfaces of said electrode and said electrode seating have cylindrical or conical surfaces having a common central axis with respect to the central axis of said electrode.

11. The plasma torch according to either one of claims 9 and 10, wherein the mutually contacting electrical connection surfaces of said electrode and said electrode seating are located inside said cooling water passage or in the vicinity of said cooling water passage.

12. An electrode for a plasma torch, which is retained by coupling detachably with an electrode seating of a plasma torch, and which receives a supply of arc current by being connected electrically to said electrode seating, comprising:

an electrical connection surface which contacts an electrical connection surface on said electrode seating, thereby forming an electrical connection between said electrode and said electrode seating, when the electrode is coupled to said electrode seating; and an elastic member which presses the electrical connection surface of said electrode against the electrical connection surface of said electrode seating by elastic force generated by elastic deformation, when the electrode is coupled to said electrode seating.

13. The electrode for a plasma torch according to claim 12, having an approximately cylindrical shape, and comprising:

a heat-resistant insert forming an arc generating point at the front end portion thereof; and a skirt section which is inserted into said electrode seating at the base end portion thereof, said skirt section being divided by a plurality of slits into a plurality of said elastic members which are tongue-shaped and capable of elastic deformation in the inward direction, and these tongue-shaped elastic members having said electrical connection surface on the outer circumference thereof.

14. A plasma torch comprising a nozzle at the front end portion of the torch main unit, disposed in such a manner that it covers an electrode and separates said electrode from a plasma gas passage; comprising:

a cylindrical guide made from insulating material which is fit between said electrode and said nozzle;

a first elastic member, which is inserted between the outer circumference of said electrode and the inner circumference of said guide, in a continuous circumferential fashion or in a plurality of locations about the circumference thereof, and positions said electrode and said guide in the radial direction, by means of elastic expansion and contraction; and a second elastic member, which is inserted between the outer circumference of said guide and the inner circumference of said nozzle, in a continuous circumferential fashion or in a plurality of locations about the circumference thereof, and positions said guide and said nozzle in the radial direction, by means of elastic expansion and contraction.

15. The plasma torch according to claim 14, wherein one member selected from said electrode and said nozzle is fixed to said torch main unit, the other member assuming a state free from external forces in the radial direction, apart from the force imparted by said one member via said guide and said first and second elastic members.

16. The plasma torch according to either one of claims 14 or 15, wherein:

said nozzle comprises a first step section on the inner side thereof, to be applied on one end of said guide for determining the positional relationship between said guide and said nozzle in the axial direction thereof; and said electrode comprises a second step section on the outer side thereof, to be applied on the other end of said guide for determining the positional relationship between said guide and said electrode in the axial direction thereof.

17. The plasma torch according to any one of claims 14–15 further comprising a retainer cap for retaining said nozzle and fixing said nozzle to said torch main unit; wherein said retainer cap fixes said nozzle to said torch main unit by means of a pressing force which acts towards said torch main unit in a parallel direction to the central axis of said nozzle and does not include any substantial force acting in the radial direction or rotational direction.

18. A cylindrical guide made from insulating material which is fit between a nozzle and an electrode of a plasma torch; comprising:

an inner circumference confronting the outer circumference of said electrode; and an outer circumference confronting the inner circumference of said nozzle;

a first elastic member installing section provided on the inner circumference of said guide, for installing a first elastic member, which is interposed between the inner circumference of said guide and the outer circumference of said electrode and positions said electrode and said guide in the radial direction, by means of elastic expansion and contraction; and a second elastic member installing section provided on the outer circumference of said guide, for installing a second elastic member, which is interposed between the outer circumference of said guide and the inner circumference of said nozzle and positions said guide and said nozzle in the radial direction, by means of elastic expansion and contraction.

19. A cylindrical guide made from insulating material which is fit between a nozzle and an electrode of a plasma torch; comprising:

an inner circumference confronting the outer circumference of said electrode; and having a clearance between the inner circumference of said guide and the outer circumference of said electrode, in order that positioning of said electrode and said guide in the radial direction can be performed by means of elastic expansion and contraction of an O-ring inserted therebetween.

20. A cylindrical guide made from insulating material which is fit between a nozzle and an electrode of a plasma torch; comprising:

an outer circumference confronting the inner circumference of said nozzle; and having a clearance between the outer circumference of said guide and the inner circumference of said nozzle, in order that positioning of said guide and said nozzle in the radial direction can be performed by means of elastic expansion and contraction of an O-ring inserted therebetween.

21. A nozzle for a plasma torch, disposed inside the plasma torch in such a manner that it covers an electrode by means of a cylindrical guide made from insulating material, comprising:

an inner circumference confronting the outer circumference of said guide; and an elastic member contacting section provided on the inner circumference of said nozzle, for contacting an elastic member, which is interposed between the outer circumference of said guide and the inner circumference of said nozzle and positions said guide and said nozzle in the radial direction, by means of elastic expansion and contraction.

22. A nozzle for a plasma torch, disposed inside the plasma torch in such a manner that it covers an electrode by means of a cylindrical guide made from insulating material, comprising:

an inner circumference confronting the outer circumference of said guide; and having a clearance between the outer circumference of said guide and the inner circumference of said nozzle, in order that positioning of said guide and said nozzle in the radial direction can be performed by means of elastic expansion and contraction of an O-ring inserted therebetween.

23. An electrode for a plasma torch, disposed inside the plasma torch in such a manner that it is covered by a nozzle by means of a cylindrical guide made from insulating material, comprising:

an outer circumference confronting the inner circumference of said guide; and an elastic member contacting section provided on the inner circumference of said electrode, for contacting an elastic member, which is interposed between the inner circumference of said guide and the outer circumference of said electrode and positions said guide and said electrode in the radial direction, by means of elastic expansion and contraction.

24. An electrode for a plasma torch, disposed inside the plasma torch in such a manner that it is covered by a nozzle by means of a cylindrical guide made from insulating material, comprising:

an outer circumference confronting the inner circumference of said guide; and having a clearance between the inner circumference of said guide and the outer circumference of said electrode, in order that positioning of said guide and said electrode in the radial direction can be performed by means of elastic expansion and contraction of an O-ring inserted therebetween.

* * * * *